United States Patent
Maegawa et al.

(10) Patent No.: US 10,875,340 B2
(45) Date of Patent: Dec. 29, 2020

(54) RECEIVING SOLUTION, INK SET CONTAINING THIS RECEIVING SOLUTION, AND METHOD FOR PRODUCING PRINTED MATERIAL WITH USE OF INK SET

(71) Applicant: DNP Fine Chemicals Co., Ltd., Yokohama (JP)

(72) Inventors: Yoshiya Maegawa, Yokohama (JP); Fumie Yamazaki, Yokohama (JP); Naoki Shiraishi, Yokohama (JP); Kisei Matsumoto, Yokohama (JP); Kentaro Otomo, Yokohama (JP)

(73) Assignee: DNP Fine Chemicals Co., Ltd., Yokohama (JP)

( * ) Notice: Subject to any disclaimer, the term of this patent is extended or adjusted under 35 U.S.C. 154(b) by 0 days.

(21) Appl. No.: 16/495,854

(22) PCT Filed: Mar. 28, 2018

(86) PCT No.: PCT/JP2018/012877
§ 371 (c)(1),
(2) Date: Sep. 20, 2019

(87) PCT Pub. No.: WO2018/181527
PCT Pub. Date: Oct. 4, 2018

(65) Prior Publication Data
US 2020/0070554 A1 Mar. 5, 2020

(30) Foreign Application Priority Data

Mar. 31, 2017 (JP) .................................. 2017-073233

(51) Int. Cl.

| | | |
|---|---|---|
| *C09D 11/40* | (2014.01) | |
| *B41M 5/00* | (2006.01) | |
| *C08K 5/098* | (2006.01) | |
| *C08K 5/13* | (2006.01) | |
| *C09D 11/023* | (2014.01) | |
| *C09D 11/033* | (2014.01) | |
| *C09D 11/38* | (2014.01) | |
| *C09D 11/54* | (2014.01) | |
| *B41J 2/01* | (2006.01) | |

(52) U.S. Cl.
CPC .......... *B41M 5/0017* (2013.01); *C08K 5/098* (2013.01); *C08K 5/13* (2013.01); *C09D 11/023* (2013.01); *C09D 11/033* (2013.01); *C09D 11/38* (2013.01); *C09D 11/40* (2013.01); *C09D 11/54* (2013.01); *B41J 2/01* (2013.01)

(58) Field of Classification Search
CPC ........ B41M 5/0017; C08K 5/098; C08K 5/13; C09D 11/023; C09D 11/033; C09D 11/38; C09D 11/40; C09D 11/54; B41J 2/01
See application file for complete search history.

(56) References Cited

U.S. PATENT DOCUMENTS

| | | |
|---|---|---|
| 6,506,239 B1 | 1/2003 | Osumi et al. |
| 2013/0141500 A1 | 6/2013 | Prasad et al. |
| 2015/0091973 A1* | 4/2015 | Ikoshi .................... C09D 11/54 347/21 |
| 2015/0239261 A1 | 8/2015 | Sugiyama et al. |
| 2016/0339719 A1 | 11/2016 | Yano |

FOREIGN PATENT DOCUMENTS

| | | | |
|---|---|---|---|
| EP | 0534634 A1 | 3/1993 | |
| EP | 1022151 A1 | 7/2000 | |
| EP | 2233309 A2 | 9/2010 | |
| EP | 2522701 A1 | 11/2012 | |
| JP | S63-299970 A | 12/1988 | |
| JP | H05-202328 A | 8/1993 | |
| JP | 2001-162920 A | 6/2001 | |
| JP | 2008-265060 A | 11/2008 | |
| JP | 2012-111845 A | 6/2012 | |
| JP | 2012111845 A * | 6/2012 | .......... B41M 5/0017 |
| JP | 2013-151087 A | 8/2013 | |
| JP | 2015-161043 A | 9/2015 | |
| JP | 2016-215619 A | 12/2016 | |
| JP | 2017-013349 A | 1/2017 | |
| JP | 2017-013350 A | 1/2017 | |
| JP | 2017-024397 A | 2/2017 | |
| JP | 2017-088646 A | 5/2017 | |
| WO | 15/041702 A1 | 3/2015 | |

OTHER PUBLICATIONS

Atsushi Fujita, "Prediction of Organic Compounds by a Conceptional Diagram", Pharmaceutical Bulletin, Jan. 1, 1954, pp. 163-173.(cited in the Feb. 24, 2020 Search Report issued for EP18775358.7).
Extended European Search Report dated Feb. 24, 2020., issued in the EP Patent Application No. 18775358.7.
International Search Report dated May 15, 2018, issued for PCT/JP2018/012877.

* cited by examiner

*Primary Examiner* — Yaovi M Ameh
(74) *Attorney, Agent, or Firm* — Locke Lord LLP

(57) ABSTRACT

This receiving solution for inkjet recording inks contains a resin emulsion as the resin; the polyvalent metal salt contains ions of a polyvalent metal and anions of an organic material; the (organic value)/(inorganic value) ratio, namely the OV/IV value of the anions of the organic material is 0.25 or more but less than 1.30; the HLB value of the surfactant is from 9 to 19 (inclusive); and the surfactant is represented by general formula (1). (In the formula, $R_1$ represents an optionally branched alkylene group having 1 to 5 carbon atoms (inclusive); $R_2$ represents a hydrogen atom or an optionally branched alkyl group having 1 to 3 carbon atoms (inclusive); $R_3$ represents a hydrogen atom or an optionally branched alkyl group having 1 to 3 carbon atoms (inclusive); A represents 2 or 3; X represents ethylene oxide and/or propylene oxide; and n represents an integer).

20 Claims, No Drawings

RECEIVING SOLUTION, INK SET CONTAINING THIS RECEIVING SOLUTION, AND METHOD FOR PRODUCING PRINTED MATERIAL WITH USE OF INK SET

TECHNICAL FIELD

The present invention relates to a receptive solution for ink-jet recording ink that is mainly an aggregation type, an ink set containing the receptive solution, and a method for producing a printed material using the ink set.

BACKGROUND ART

The ink-jet recording method is a recording method which directly ejects and applies ink droplets from very fine nozzles to a recording medium such as paper, thereby obtaining letters and/or images. For this recording method, miniaturization, speed increase, noise reduction, power saving, and colorization are easy, and even more, non-contact printing to the recording medium is possible, and therefore, the application range is not only household use, but is expanding to office use and commercial printing use.

As an ink composition used in ink-jet recording method, an aqueous dye ink in which various water-soluble dyes are dissolved in water, or in a liquid mixture of water and water-soluble organic solvent, is widely used. However, when an ink composition of an aqueous dye is ejected on a recording medium like paper that is used widely in general, such as plain paper and recycled paper, the ink composition is absorbed into the paper fibers, and, simultaneously, spreads around the landing position so that blurring that is called feathering may occur.

As such, by focusing on the fact that the dye is anionic, it has been proposed that, before applying the aqueous dye ink composition on a recoding medium, a receptive solution for ink-jet recording ink containing polyvalent metal salts is applied on the recording medium, and then the aqueous dye ink composition is ejected onto the receptive solution (for example, see, Patent Documents 1 to 4). By ejecting the aqueous dye ink composition onto a receptive solution, the image quality can be improved when printing is made.

In this case, the storage stability of a receptive solution may become an issue, similar to the storage stability of an ink composition. For example, as the polyvalent metal salts that had been contained in the receptive solution precipitate out, nozzle clogging in the ink-jet head or blockage of the flow path of the reaction liquid may occur in the ink-jet recording device. In addition, as the receptive solution for ink-jet recording deteriorates along with the passage of time, there has been a demand for increasing the storage stability so as to suppress the deterioration of the receptive solution.

As such, a receptive solution in which composition of the polyvalent metal salts to be contained in the receptive solution is specified and also a resin emulsion is contained has been proposed (see, Patent Document 5). The receptive solution of Patent Document 5 is a receptive solution which enables the improvement of storage stability and also the enhancement of image quality of a printed matter.

Patent Document 1: Japanese Unexamined Patent Application, Publication No. S63-299970
Patent Document 2: Japanese Unexamined Patent Application, Publication No. H5-202328
Patent Document 3: Japanese Unexamined Patent Application, Publication No. 2001-162920
Patent Document 4: Japanese Unexamined Patent Application, Publication No. 2012-111845
Patent Document 5: Japanese Unexamined Patent Application, Publication No. 2017-24397

DISCLOSURE OF THE INVENTION

Problems to be Solved by the Invention

For a receptive solution containing a resin emulsion, a surfactant may be contained in the receptive solution to form a resin emulsion. Meanwhile, as described in the above, to enhance the image quality when printing is made, metal salts are contained in the receptive solution. Examples of the metal salts include inorganic salts which contain ions of metal and anions of an inorganic substance, and organic salts which contain ions of metal and anions of an organic substance (organic acid).

However, according to the idea of the inventors of the present invention, it is found that, based on the relationship between the anions of polyvalent metal salts and resin in the receptive solution, viscosity of the receptive solution increases and storage stability of the receptive solution deteriorates.

The present invention is achieved in consideration of the above circumstances, and an object thereof is to provide a receptive solution having improved storage stability.

Means for Solving the Problems

To solve the aforementioned problems, the inventors of the present invention have conducted intensive studies, and, have found that by focusing on an OV/IV value as a ratio of an organic value to an inorganic value of anions contained in the receptive solution and a structure of a surfactant, the problems can be solved by a receptive solution containing predetermined anions and a surfactant, thereby completing the present invention.

(1) A receptive solution for ink-jet recording ink, containing polyvalent metal salts, a water-soluble solvent, a resin, and a surfactant in which a resin emulsion is contained as the resin, the polyvalent metal salts include ions of a polyvalent metal and anions of an organic substance, an OV/IV value as a ratio of an organic value to an inorganic value of the anions of an organic substance is 0.25 or more but less than 1.30, an HLB value of the surfactant is 9 or more and 19 or less, and the surfactant is represented by the following general formula (1)

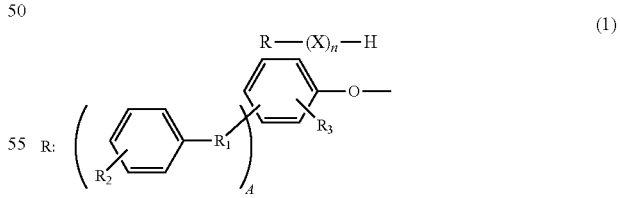

(In the formula, $R_1$ represents an optionally branched alkylene group having carbon atom number of 1 or more and 5 or less. $R_2$ represents a hydrogen atom or an optionally branched alkyl group having carbon atom number of 1 or more and 3 or less. $R_3$ represents a hydrogen atom or an optionally branched alkyl group having carbon atom number of 1 or more and 3 or less. A represents 2 or 3. X represents ethylene oxide and/or propylene oxide. n represents an integer).

(2) The receptive solution described in (1), in which the resin is a cationic resin and/or a non-ionic resin.

(3) The receptive solution described in (1) or (2), in which the receptive solution is ejected by an ink-jet method.

(4) The receptive solution described in any one of (1) to (3), in which content of the surfactant is 0.5% by mass or more and 4.5% by mass or less in the whole amount of the receptive solution.

(5) An ink set including the receptive solution described in any one of (1) to (4) and an ink composition containing a color material.

(6) A method for producing a printed material including a step of applying the receptive solution described in any one of (1) to (4) on a recording medium, or on an ink composition containing a color material.

Effects of the Invention

The receptive solution of the present invention is a receptive solution having improved storage stability.

PREFERRED MODE FOR CARRYING OUT THE INVENTION

Hereinbelow, specific embodiments of the present invention are described in detail, but the present invention is not limited to the following embodiments at all, and, within the scope of the object of the present invention, the present invention can be carried out by adding suitable modifications.

<Receptive Solution>

The receptive solution of one embodiment of the present invention is a receptive solution which contains at least polyvalent metal salts, a water-soluble solvent, a resin, and a surfactant. By applying an aqueous color material ink composition on the receptive solution, image quality can be enhanced when printing is made. Furthermore, the polyvalent metal salts contained in the receptive solution of the present embodiment are salts containing polyvalent metal ions and anions. The polyvalent metal ions indicate metal ions having the valency of at least 2. The anions indicate anions that can be dissolved in a water-soluble solvent. The water-soluble solvent indicates a solvent which can be dissolved, in 100 parts by mass of water at 25° C., at 5 parts by mass or more under 1 atmospheric pressure. The color material has a concept including both a dye and a pigment.

Furthermore, in the present specification, the "receptive solution containing polyvalent metal salts" has a concept including not only a receptive solution obtained by adding polyvalent metal salts during the production of a receptive solution but also a receptive solution containing polyvalent metal ions and anions resulting from addition of a compound capable of generating polyvalent metal ions and a compound capable of generating anions during the production of a receptive solution. For example, even if the polyvalent metal salts are not directly added during the production of a receptive solution, an embodiment in which anions (for example, caprylic acid ion) and polyvalent metal ions (for example, calcium ion) are contained in the receptive solution by adding a compound capable of generating anions (for example, caprylic acid) and a compound capable of generating polyvalent metal ions (for example, calcium hydroxide) to the receptive solution so that each compound can form ions in the receptive solution is also within the scope of the present invention.

In addition, the anions relating to the present embodiment contain anions of an organic substance and the OV/IV value as a ratio of an organic value to an inorganic value of the anions of an organic substance (hereinbelow, simply described as "OV/IV value of anions of an organic substance") is 0.25 or more but less than 1.30. Herein, the organic value and inorganic value mean the organic value and inorganic value of an organic concept drawing, and, for all organic compounds, the two factors, i.e., the "organic" originating from the covalent bond linkage in carbon region of the compound and "inorganic" resulting from an influence of the electrostaticity present in a substituent group (functional group), are converted into a numeric value based on the descriptions given in "Qualitative Organic Analysis" (1970, written by Atsushi Fujita), and the organic value is plotted on an X axis and the inorganic value is plotted on a Y axis of a drawing. Furthermore, in the present specification, the "organic value•inorganic value of anions of an organic substance" means not an organic value•inorganic value of anions themselves (for example, caprylic acid ion: $C_8H_{15}COO^-$) but an organic value•inorganic value of an organic substance in which a hydrogen ion (H1 is given to the anions of an organic substance (for example, caprylic acid: $C_8H_{15}COOH$), for the sake of simple calculation.

According to the idea of the inventors of the present invention, the followings are found as a cause of having lower storage stability of the receptive solution. To improve the dispersion property of a resin emulsion in the receptive solution, the resin and a hydrophobic part of a surfactant for forming a resin emulsion need to be adsorbed to each other in the resin emulsion such that the entire surface of the resin can be covered. However, in a case in which the adsorption property between the hydrophobic part of anions of an organic substance originating from polyvalent metal salts and the resin is high, a case in which anions of an organic substance originating from polyvalent metal salts are adsorbed onto the resin emulsion or a case in which a surfactant on a resin surface for forming a resin emulsion and anions of an organic substance originating from polyvalent metal salts are substituted with each other may occur. In addition, as the anions of an organic substance originating from polyvalent metal salts are present in part of the resin emulsion, a lower dispersion property of a resin is yielded in the receptive solution so that the resins are aggregated to each other. As a result, higher viscosity of the receptive solution is yielded while the storage stability of the receptive solution deteriorates. In addition, as the storage stability of the receptive solution deteriorates, bending at an ink-jet head or the number of nozzles showing no ejection increases when the receptive solution is ejected by an ink-jet method, and thus the ejection stability also deteriorates.

Accordingly, the receptive solution of the present embodiment has the OV/IV value of anions of an organic substance contained in anions, and a surfactant having a predetermined structure. The OV/IV value of anions of an organic substance is a value which corresponds to a ratio of the organic value of a compound to the inorganic value of anions of an organic substance, and it is an index representing the non-polarity level of anions of an organic substance. The receptive solution of the present embodiments has a specific OV/IV value of anions of an organic substance contained in anions that are contained in the receptive solution, and a surfactant with specific structure and HLB value. Accordingly, by preventing the adsorption or substitution of anions of an organic substance originating from polyvalent metal salts to the resin emulsion, it becomes possible to improve the storage stability and ejection stability of the receptive solution.

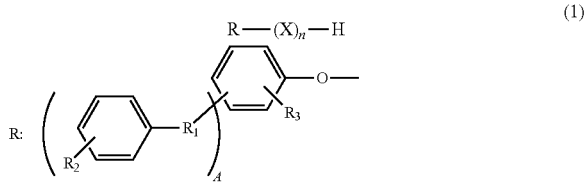

(1)

(In the formula, $R_1$ represents an optionally branched alkylene group having carbon atom number of 1 or more and 5 or less. $R_2$ represents a hydrogen atom or an optionally branched alkyl group having carbon atom number of 1 or more and 3 or less. $R_3$ represents a hydrogen atom or an optionally branched alkyl group having carbon atom number of 1 or more and 3 or less. A represents 2 or 3. X represents ethylene oxide and/or propylene oxide. n represents an integer).

The surfactant is a surfactant which consists of a hydrophobic part "R" and a hydrophilic part "$(X)_n$—H". When the OV/IV value of the hydrophobic part "R" is calculated, the OV/IV value is 7.1 to 7.5 or so for tristyrenylated phenyl ether, for example. Namely, it is a significantly higher value than the OV/IV value of anions of an organic substance contained in anions that are contained in the receptive solution, i.e., 0.25 or more but less than 1.30. Due to this reason, compared to the anions of an organic substance, the surfactant has higher adsorption property for the resin contained in the receptive solution. Accordingly, by preventing the adsorption or substitution of the anions of an organic substance originating from polyvalent metal salts onto a resin emulsion according to adsorption of the organic group of anions of an organic substance contained in the receptive solution to the resin contained in the receptive solution, the storage stability and ejection stability of the receptive solution are improved.

The anions contained in the receptive solution relating to the present embodiment may also contain anions other than the anions of an organic substance which have an OV/IV value of 0.3 or more and 1.0 or less. Examples of the anions other than the anions of an organic substance which have an OV/IV value of 0.3 or more and 1.0 or less include, although not particularly limited, anions of an organic substance such as an anion of pantothenic acid, an anion of pantoic acid, an anion of propionic acid, an anion of ascorbic acid, an anion of acetic acid, an anion of malic acid, an anion of benzoic acid, or an anion of lactic acid, and anions of an inorganic acid such as nitric acid ion, sulfuric acid ion, or chloride ion.

Furthermore, content of the anions of an organic substance which have an OV/IV value of 0.3 or more and 1.0 or less is, relative to the entire anions contained in the receptive solution, preferably 50% by mass or more, more preferably 80% by mass or more, even more preferably 90% by mass or more, and still even more preferably 95% by mass or more.

Hereinbelow, each component contained in the receptive solution is specifically described.

[Polyvalent Metal Salts]

The polyvalent metal salts relating to the present embodiment are polyvalent metal salts which include ions of a polyvalent metal and anions containing anions of an organic substance. As the polyvalent metal salts are contained in the receptive solution, bleeding or feathering can be effectively suppressed. Hereinbelow, descriptions are given for each of the anions of an organic substance contained in anions and polyvalent metal ions.

(Anions of Organic Substance)

The anions of an organic substance contained in polyvalent metal salts of the receptive solution of the present embodiment have an OV/IV value of 0.25 or more but less than 1.30, in which the OV/IV value is a ratio of an organic value to an inorganic value as described in the above. When the OV/IV value of anions of an organic substance is less than 0.25, as dehydration occurs, the dispersion property of anions of an organic substance in the receptive solution deteriorates and also the storage stability and ejection stability of the receptive solution deteriorate, and therefore undesirable. When the OV/IV value of anions of an organic substance is 1.30 or more, as the organic group of anions of an organic substance contained in the receptive solution can easily adsorb onto the resin contained in the receptive solution, the dispersion property of the resin emulsion deteriorates and also the storage stability and ejection stability of the receptive solution deteriorate, and therefore undesirable.

The OV/IV value of anions of an organic substance is preferably 0.35 or more, and more preferably 0.50 or more. Furthermore, the OV/IV value of anions of an organic substance is preferably 1.20 or less, and more preferably 1.00 or less.

Specific examples of the anions of an organic substance include benzoic acid (OV/IV value=0.85), salicylic acid (OV/IV value=0.53), 2,4-dihydroxybenzoic acid (OV/IV value=0.38), 2,5-dihydroxybenzoic acid (OV/IV value=0.38), dimethylolpropionic acid (OV/IV value=0.29), pantothenic acid (OV/IV value=0.29), succinic acid (OV/IV value=0.27), maleic acid (OV/IV value=0.26), glutaric acid (OV/IV value=0.33), suberic acid (OV/IV value=0.53), trimellitic acid (OV/IV value=0.39), and methylmalonic acid (OV/IV value=0.27).

Furthermore, from the viewpoint of storage stability and ejection stability of the receptive solution, among the anions of an organic substance originating from polyvalent metal salts or the like, anions of an aromatic organic substance are preferable, anions of an organic substance having a benzene ring (for example, benzoic acid, salicylic acid, 2,4-dihydroxybenzoic acid, and 2,5-dihydroxybenzoic acid) or anions of an organic substance having a polycyclic aromatic hydrocarbon (for example, compound having naphthalene ring, anthracene ring or the like) are more preferable, and anions of an organic substance having a benzene ring are even more preferable. The aromatic organic substance indicates a cyclic unsaturated organic substance such as an organic substance having a benzene ring, an organic substance of a polycyclic aromatic hydrocarbon, and an organic substance of a heteroaromatic compound. Furthermore, the number of the atoms constituting one ring among the aromatic rings constituting the anions of an aromatic organic substance is preferably 5 or higher, and a benzene ring, a 5-membered heterocycle (pyrrole ring, furan ring, and thiophene ring), and a 6-membered heterocycle (pyridine ring, pyran ring, and thiopyran ring) are preferable. Furthermore, among the anions of an organic substance having a benzene ring, from the viewpoint of preventing the deterioration of appearance on a printed surface, ions of benzoic acid, salicylic acid, or suberic acid are particularly preferable.

Content (molar equivalents) of the anions of an organic substance contained in the polyvalent metal salts is preferably 0.005 Eq or more, more preferably 0.01 Eq or more, even more preferably 0.02 Eq or more, still even more preferably 0.04 Eq or more, and most preferably 0.05 Eq or more in the whole amount of the receptive solution. Herein, the Eq (molar equivalents) is defined by the formula of n/(1×m), when the valency of anions of an organic substance is "1", the number of anions of an organic substance per molecule of a polyvalent metal salt is "m", and the valency of polyvalent metal ions is "n". For example, in case of trimagnesium dicitrate ($Mg_3(C_6H_5O_7)_2$), molar equivalents of the anions of an organic substance corresponding to 1.0 molar equivalent of the polyvalent metal salts is as follows: 2/(1×3)=0.67 Eq. By having 0.005 Eq or more, the image quality can be further enhanced when printing is made. Content of the anions of an organic substance is preferably 0.80 Eq or less, more preferably 0.60 Eq or less, and most preferably 0.40 Eq or less in the whole amount of the receptive solution. As the content of the anions of an organic substance is 0.80 Eq or less in the whole amount of the receptive solution, the dispersion property of the anions of an organic substance in the receptive solution is enhanced, and also the storage stability and ejection stability of the receptive solution are enhanced.

Furthermore, the anions originating from polyvalent metal salts or the like relating to the present embodiment may also contain anions other than the anions of an organic substance which have an OV/IV value of 0.3 or more and 1.0 or less. Examples of the anions other than the anions of an organic substance which have an OV/IV value of 0.3 or more and 1.0 or less include, although not particularly limited, anions of an organic substance such as an anion of pantothenic acid, an anion of pantoic acid, an anion of propionic acid, an anion of ascorbic acid, an anion of acetic acid, an anion of malic acid, an anion of benzoic acid, or an anion of lactic acid, and anions of an inorganic acid such as nitric acid ion, sulfuric acid ion, or chloride ion.

Furthermore, content of the anions of an organic substance which have an OV/IV value of 0.3 or more and 1.0 or less in the anions of an organic substance originating from the polyvalent metal salts or the like is, relative to the entire anions originating from the polyvalent metal salts or the like, preferably 50% by mass or more, more preferably 80% by mass or more, even more preferably 90% by mass or more, and still even more preferably 95% by mass or more.

(Polyvalent Metal Ions)

The polyvalent metal ions contained in polyvalent metal salts of the receptive solution of the present embodiment indicate ions of a metal which has valency of at least 2. By using the polyvalent metal ions, blurring of an ink composition can be suppressed. Examples of the polyvalent metal ions include calcium ion, magnesium ion, aluminum ion, titanium ion, iron (II) ion, iron (III) ion, cobalt ion, nickel ion, copper ion, zinc ion, barium ion, and strontium ion. Among them, from the viewpoint of having a high interaction with a color material in the ink composition and having higher effect of suppressing the blurring or unevenness, it is preferable to contain one or more types selected from calcium ion, magnesium ion, nickel ion, zinc ion, and aluminum ion.

Preferred content (molar concentration) of the polyvalent metal ions is preferably 0.01 mol/L or more, more preferably 0.02 mol/L or more, and even more preferably 0.05 mol/L or more in the entire amount of the receptive solution. As the content of the polyvalent metal ions is 0.01 mol/L or more in the entire amount of the receptive solution, the image quality can be further improved when printing is made. The polyvalent metal ions are preferably 0.40 mol/L or less, more preferably 0.30 mol/L or less, and even more preferably 0.20 mol/L or less in the entire amount of the receptive solution. As the content of the polyvalent metal ions is 0.40 mol/L or less in the entire amount of the receptive solution, the dispersion property of the polyvalent metal ions in the receptive solution is improved.

[Surfactant]

The surfactant contained the receptive solution of the present embodiment has a role of having at least part of the resin contained in the receptive solution as a resin emulsion and controlling the surface tension of the receptive solution. The surfactant relating to the present embodiment contains a surfactant which has an HLB value of 9 or more and 19 or less and the following structure.

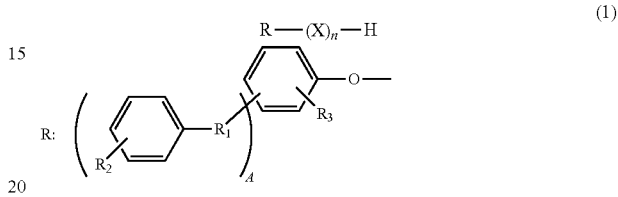

(In the formula, $R_1$ represents an optionally branched alkylene group having carbon atom number of 1 or more and 5 or less. $R_2$ represents a hydrogen atom or an optionally branched alkyl group having carbon atom number of 1 or more and 3 or less. $R_3$ represents a hydrogen atom or an optionally branched alkyl group having carbon atom number of 1 or more and 3 or less. A represents 2 or 3. X represents ethylene oxide and/or propylene oxide. n represents an integer).

The surfactant relating to the present embodiment contains a surfactant which has an HLB value of 9 or more and 19 or less. As the HLB value is 9 or more and 19 or less, affinity for the resin (hydrophobicity) is improved, and, as forming of the resin emulsion is not inhibited, the storage stability and ejection stability of the receptive solution deteriorate are improved. The surfactant relating to the present embodiment preferably contains a surfactant which has an HLB value of 10 or more. The surfactant relating to the present embodiment preferably contains a surfactant which has an HLB value of 18 or less. The HLB value represents Hydrophilic-Lipophilic Balance, and it is a value meaning the affinity of a surfactant for water and oil. The HLB value can be calculated by Griffin's method.

$R_1$ in the formula is an optionally branched alkylene group having carbon atom number of 1 or more and 5 or less, but, from the viewpoint of dispersion property of the resin emulsion, it is preferably (—$CH_2$—) or (—$CH(CH_3)$—). Furthermore, the functional group including $R_1$ ($C_6H_4$($R_2$)—$R_1$—) may be located on any position of an aromatic ring.

$R_2$ and $R_3$ in the formula are an optionally branched alkyl group having carbon atom number of 1 or more and 3 or less, but, from the viewpoint of dispersion property of the resin emulsion, it is preferably hydrogen (—H). Furthermore, the functional group of $R_2$ and $R_3$ may be located on any position of an aromatic ring, or located on plural locations thereof.

As A in the formula is 2 or 3, a favorable dispersion property of the resin emulsion can be achieved. A is more preferably 3. If A is 1, the adsorption property between the resin and surfactant deteriorates, and it becomes relatively easier for the organic group of anions of an organic substance to adsorb onto a resin contained in the receptive solution, and thus the storage stability and ejection stability of the receptive solution deteriorate. If A is 4 or more, the OV/IV value of the hydrophobic part "R" of a surfactant becomes excessively large, and thus dispersion property of the resin emulsion deteriorates.

X in the formula is ethylene oxide and/or propylene oxide. X constitutes a hydrophilic part of a surfactant. In the hydrophilic part "$(X)_n$—H", X may consist of ethylene oxide or propylene oxide, or it may consist of a copolymer in which both ethylene oxide and propylene oxide are included. From the viewpoint of obtaining the affinity of a surfactant for the water-soluble solvent, it is preferable that X consists of ethylene oxide.

n in the formula represents the number of repeat units in the aforementioned X. n is not particularly limited as long as it allows that the HLB value of a surfactant is 9 or more and 19 or less. n is preferably 9 or more, more preferably 14 or more, and even more preferably 19 or more. n is preferably 60 or less, more preferably an integer of 57 or less, and even more preferably an integer of 55 or less. As n is 9 or more and 60 or less, the dispersion property of the resin emulsion is improved.

Specific examples of a surfactant having the above structure include tristyrenylated phenyl ether (TSP), tribenzylphenyl ether (TBP), distyrenylated phenyl ether (DSP), and dibenzylphenyl ether.

Although it may vary depending on the content of a resin included in the receptive solution and surface tension required for the receptive solution, content of a surfactant having the above structure is preferably 0.5% by mass or more, and more preferably 1.5% by mass or more in the whole amount of the receptive solution. As the content of a surfactant having the above structure is 0.5% by mass or more in the whole amount of the receptive solution, a suitable amount of a resin emulsion can be formed from the resin contained in the receptive solution. Content of the surfactant having the above structure is preferably 4.5% by mass or less, and more preferably 3.5% by mass or more in the whole amount of the receptive solution. As the content of a surfactant having the above structure is 4.5% by mass or less in the whole amount of the receptive solution, it is possible to obtain the surface tension that is required for the receptive solution.

Furthermore, the surfactant relating to the present embodiment may contain a surfactant other than the surfactant which has an HLB value of 9 or more and 19 or less and is represented by the general formula (1). As for the surfactant other than the surfactant which has an HLB value of 9 or more and 19 or less and is represented by the general formula (1), a polysiloxane compound, an anionic surfactant, a non-ionic surfactant, a fluorine-based surfactant, an alkylene oxide modified acetylene glycol-based surfactant, an alkylene oxide non-modified acetylene glycol-based surfactant, or the like can be mentioned, although it is not particularly limited thereto.

In the whole amount of a surfactant contained in the receptive solution of the present embodiment, content of the surfactant which has an HLB value of 9 or more and 19 or less and is represented by the general formula (1) is preferably 50% by mass or more, more preferably 80% by mass or more, even more preferably 90% by mass or more, and most preferably 95% by mass or more.

[Resin]

A resin is contained in the receptive solution of the present embodiment. Examples of the resin include a resin having hydrophilic group, and a cationic-based or non-ionic based resin emulsion. From the viewpoint of the adsorption property of a surfactant relating to the present embodiment to the hydrophobic part, it is preferably a cationic resin and/or a non-ionic resin, and more preferably a cationic resin. By using those resins, various resistances such as scratch resistance, water resistance, solvent resistance, and blocking resistance can be imparted to an obtained printed material, or gloss or print concentration of a printed material can be enhanced. Furthermore, at least part of the resin contained in the receptive solution of the present embodiment is contained as a resin emulsion. The resin emulsion in the present embodiment means an aqueous dispersion in which the continuous phase is a water-soluble solvent and the particles for dispersion are fine resin particles. By forming a resin emulsion, the resin can be dispersed, due to steric repulsive force or electrostatic repulsive force, as fine resin particles in the receptive solution.

The resin emulsion has a property of thickening•aggregation when the water-soluble solvent, which is generally in continuous phase, is reduced by evaporation, permeation, or the like, and it also has an effect of promoting fixation of a color material on a recording medium. With the receptive solution of the present embodiment that is so-called aggregation type by which blurring of an ink composition is suppressed by aggregating the color material, a large amount of an ink composition can be fixed at high speed. On the other hand, there is also a receptive solution of so-called permeation type in which the receptive solution is ejected on a recording medium followed by drying•solidification to form a porous layer, an ink composition is applied on the porous layer, and the ink composition is allowed to permeate into pores of the porous layer, but the receptive solution of the present embodiment that is an aggregation type has a different principle•working mechanism for fixing an ink composition.

The resin contained in the receptive solution of the present embodiment is not particularly limited as long as it can exhibit desired water resistance, but an acrylic resin, a polystyrene resin, a polyester resin, a vinyl chloride resin, a vinyl acetate resin, a vinyl chloride-vinyl acetate copolymer resin, a polyethylene resin, a urethane resin, a silicone (silicon) resin, an acrylamide resin, an epoxy resin, or a copolymerization resin or a mixture thereof can be used, for example. They are preferable from the viewpoint that they can enhance the solvent resistance in addition to the water resistance. Among them, from the viewpoint of having excellent ejection stability, water resistance, and solvent resistance, it is preferable to contain an acrylic resin.

The acrylic resin is not particularly limited as long as it contains a (meth)acrylic acid ester monomer as a main component of the constituting monomers. As for the (meth) acrylic acid ester monomer, known compounds can be used, and a monofunctional (meth)acrylic acid ester can be preferably used. Examples thereof include (meth)acrylic acid alkyl ester, (meth)acrylic acid aralkyl ester, and (meth) acrylic acid alkoxyalkyl ester. Specific examples thereof include (meth)acrylic acid esters such as methyl (meth) acrylate, ethyl (meth)acrylate, n-propyl (meth)acrylate, iso-propyl (meth)acrylate, n-butyl (meth)acrylate, sec-butyl (meth)acrylate, iso-butyl (meth)acrylate, tert-butyl (meth) acrylate, pentyl (meth)acrylate, neopentyl (meth)acrylate, hexyl (meth)acrylate, 2-ethylhexyl (meth)acrylate, octyl (meth)acrylate, iso-octyl (meth)acrylate, nonyl (meth)acrylate, iso-nonyl (meth)acrylate, dodecyl (meth)acrylate, tridecyl (meth)acrylate, stearyl (meth)acrylate, cyclopentyl (meth)acrylate, cyclohexyl (meth)acrylate, 2-methylcyclohexyl (meth)acrylate, dicyclopentanyl (meth)acrylate, dicyclopentenyl (meth)acrylate, dicyclopentanyloxyethyl (meth) acrylate, dicyclopentenyloxyethyl (meth)acrylate, dicyclohexyl (meth)acrylate, isobornyl (meth)acrylate, adamantyl (meth)acrylate, allyl (meth)acrylate, propargyl (meth)acrylate, phenyl (meth)acrylate, naphthyl (meth)acrylate, anthracenyl (meth)acrylate, anthraninonyl (meth)acrylate, piperonyl (meth)acrylate, salicyl (meth)acrylate, furyl (meth)acrylate, furfuryl (meth)acrylate, tetrahydrofuryl (meth)acrylate, tetrahydrofurfuryl (meth)acrylate, pyranyl (meth)acrylate, benzyl (meth)acrylate, phenethyl (meth)acrylate, cresyl (meth)acrylate, glycidyl (meth)acrylate, 3,4-epoxycyclohexylmethyl (meth)acrylate, 3,4-epoxycyclohexylethyl (meth)acrylate, 1,1,1-trifluoroethyl (meth)acrylate, perfluoroethyl (meth)acrylate, perfluoro-n-propyl (meth)acrylate, perfluoro-iso-propyl (meth)acrylate, heptadecafluorodecyl (meth)acrylate, triphenylmethyl (meth)acrylate, cumyl (meth)acrylate, 3-(N,N-dimethylamino) propyl (meth)acrylate, methoxyethyl (meth)acrylate, ethoxyethyl (meth)acrylate, butoxyethyl (meth)acrylate, 2-cyanoethyl (meth)acrylate, dimethylaminoethyl (meth)acrylate, diethylaminoethyl (meth)acrylate, trimethoxysilylpropyl (meth)acrylate, triethoxysilylpropyl (meth)acrylate, 3-methacryloxypropylmethyldiethoxysilane, and 3-methacryloxypropylmethyl dimethoxysilane. Furthermore, "(meth)acryl" means both "acryl" and "methacryl". Those monomers can be obtained from Mitsubishi Rayon Co., Ltd., NOF CORPORATION, Mitsubishi Chemical Corporation, Hitachi Chemical Company, Ltd., or the like.

The monomer constituting an acryl resin can be an acid group-containing monomer having an acid group, a hydroxyl group-containing monomer having a hydroxyl group, or an amino group-containing monomer having an amino group. Examples of the acid group-containing monomer having an acid group include a carboxyl group-containing monomer which has an ethylenically unsaturated double bond and a carboxyl group such as carboxyl group-containing aliphatic monomer such as acrylic acid, methacrylic acid, itaconic acid, fumaric acid, maleic acid, crotonic acid, citraconic acid, maleic anhydride, monomethyl maleate ester, monobutyl maleate ester, monomethyl itaconate ester, monobutyl itaconate ester, vinyl benzoate, monohydroxyethyloxalic acid (meth)acrylate, or caprolactone-modified (meth)acrylate having terminal carboxyl group. Examples of the hydroxyl group-containing monomer having a hydroxyl group include, although it is not particularly limited as long as it has an ethylenically unsaturated double bond and a hydroxyl group, 2-hydroxyethyl (meth)acrylate, 2-hydroxypropyl (meth)acrylate, 3-hydroxyethyl (meth)acrylate, 3-hydroxypropyl (meth)acrylate, 2-hydroxybutyl (meth)acrylate, 4-hydroxybutyl (meth)acrylate, caprolactone-modified hydroxy(meth)acrylate, methyl α-(hydroxymethyl)(meth)acrylate, ethyl α-(hydroxymethyl) (meth)acrylate, n-butyl α-(hydroxymethyl) (meth)acrylate, 1,4-cyclohexanedimethanol mono(meth)acrylate, and 4-hydroxybutyl (meth) acrylate. Examples of the amino group-containing monomer include, although it is not particularly limited as long as it has an ethylenically unsaturated double bond and an amino group, an acrylamide compound such as (meth)acrylamide N-monomethyl (meth)acrylamide, N-monoethyl (meth) acrylamide, N,N-dimethyl (meth)acrylamide, N-n-propyl (meth)acrylamide, N-isopropyl (meth)acrylamide, methylenebis(meth)acrylamide, N-methylol (meth)acrylamide, N-butoxymethyl (meth)acrylamide, dimethylaminoethyl (meth)acrylamide, N,N-dimethylaminopropylacrylamide, or diacetone acrylamide, a nitrogen atom-containing (meth) acrylate compound such as dimethylaminoethyl (meth)acrylate, diethylaminoethyl (meth)acrylate, or (meth)acrylate of ethylene oxide adduct of morpholine, N-vinylpyrrolidone, N-vinylpyridine, N-vinylimidazole, N-vinylpyrrol, N-vinyloxazolidone, N-vinylsuccinimide, N-vinylmethylcarbamate, N,N-methylvinylacetamide, (meth)acryloyloxyethyltrimethyl ammonium chloride, 2-isopropenyl-2-oxazoline, and 2-vinyl-2-oxazoline, (meth)acrylonitrile.

Furthermore, the monomer constituting an acryl resin can have, other than the aforementioned (meth)acrylic acid ester monomer or the like, other monomers, if necessary. Those other monomers are not particularly limited as long as they can be copolymerized with the aforementioned (meth) acrylic acid ester monomer and enable obtainment of an acrylic resin with desired water resistance and solvent resistance, and it may be either a monofunctional monomer in which the number of the ethylenically unsaturated double bonds is 1, or a polyfunctional monomer in which the number of the ethylenically unsaturated double bonds is 2 or higher. Examples thereof which can be used include a vinyl monomer such as vinyl acetate, vinyl chloride, vinylidene chloride, vinyl fluoride, vinylidene fluoride, N-vinylpyrrolidone, vinylpyridine, N-vinylcarbazole, vinylimidazole, vinyl ether, vinyl ketone, or vinyl pyrrolidone; an aromatic vinyl monomer such as styrene, α-, o-, m-, p-alkyl, nitro, cyano, amide, or ester derivative of styrene, vinyl toluene, or chlorostyrene; an olefin monomer such as ethylene, propylene, or isopropylene; a diene monomer such as butadiene or chloroprene; and a vinyl cyanide compound such as acrylonitirile or methacrylonitrile. Furthermore, a diacrylate compound such as polyethylene glycol diacrylate, triethylene glycol diacrylate, or 1,3-butylene glycol diacrylate; a triacrylate compound such as trimethylolpropane triacrylate, trimethylolethane triacrylate, or tetramethylolmethane triacrylate; a dimethacrylate compound such as ethylene glycol dimethacrylate, diethylene glycol dimethacrylate, or triethylene glycol dimethacrylate; a trimethacrylate compound such as trimethylolpropane trimethacrylate or trimethylolethane trimethacrylate; a divinylbenzene compound or the like can be used. Furthermore, although the acrylic resin can be formed by using those monomers, the copolymerization form of monomers is not particularly limited, and it can be a block copolymer, a random copolymer, a graft copolymer, or the like, for example. The resin emulsion can be produced by, for example, an emulsion polymerization followed by neutralization. As for the emulsifier, a common polymer type surfactant may be used, or a reactive surfactant having an unsaturated bond may be used. The synthetic method is not particularly limited, but emulsion polymerization can be carried out by mixing water, a monomer, an emulsifier, and a polymerization initiator in the presence of a reactive surfactant, a non-reactive surfactant, polyvinyl alcohol, a cellulose derivative, or the like, for example.

The average particle diameter of the resin emulsion is, from the viewpoint of the dispersion stability in the receptive solution and ink-jet ejection property, preferably 30 nm or more and more preferably 50 nm or more. The average particle diameter of the resin emulsion is, from the viewpoint of the dispersion stability in the receptive solution and ink-jet ejection property, preferably 300 nm or less and more preferably 250 nm or less. Furthermore, the number average particle diameter of a pigment can be measured by using a concentrated type particle size analyzer (FPAR-1000 manufactured by Otsuka Electronics Co., Ltd.) at a measurement temperature of 25° C.

The mass average molecular weight of the resin emulsion is, from the water resistance of a coating film, preferably 10000 or more, and more preferably 100000 or more. The mass average molecular weight of the resin emulsion is, from the stability of the receptive solution, preferably 1000000 or less and more preferably 500000 or less. Furthermore, the molecular weight of the resin in the present embodiment indicates the mass average molecular weight Mw, which is a value measured by GPC (Gel Permeation Chromatography), and it can be measured by "HLC-8120GPC" that is manufactured by Tosoh Corporation, while polystyrene standards for curve calibration is used as a reference.

The glass transition temperature of the resin emulsion is, from the viewpoint that a printed material with water resistance, solvent resistance, and scratch resistance can be formed even for a case in which printing is made on a low absorbing substrate or a non-absorbing substrate, and also from the viewpoint that application of high temperature for forming a printed material can be avoided, a large amount of energy is not required to have, and the substrate for printing is not likely to receive a damage caused by heat, preferably 0° C. or higher, more preferably 10° C. or higher, and even more preferably 20° C. or higher. The glass transition temperature of the resin emulsion is preferably 100° C. or lower, more preferably 90° C. or lower, and even more preferably 80° C. or lower. Furthermore, the glass transition temperature (Tg) can be measured by a differential scanning calorimeter "DSC-50" manufactured by SHIMADZU CORPORATION, for example.

Part by mass of the resin (resin emulsion) in the receptive solution of the present embodiment, which is included in 100 parts by mass of the receptive solution, is, although not particularly limited, preferably 0.5 parts by mass or more, more preferably 1.0 part by mass or more, even more preferably 3.0 parts by mass or more, and still even more preferably 5.0 parts by mass or more in the receptive solution. Furthermore, it is preferably 20.0 parts by mass or less, more preferably 15.0 parts by mass or less, and even more preferably 12.0 parts by mass or less in the ink composition.

[Water-Soluble Solvent]

The solvent for the receptive solution of the present embodiment is a solvent which can disperse or dissolve a resin or the like. As for such solvent, a water-soluble solvent having solubility in water is used.

Herein, the water-soluble solvent indicates a solvent which can be dissolved, in 100 parts by mass of water at 25° C., at 5 parts by mass or more, preferably 20 parts by mass or more, more preferably 50 parts by mass or more, and even more preferably 70 parts by mass or more under 1 atmospheric pressure.

Specifically, the water-soluble solvent that can be used for the receptive solution of the present embodiment preferably contains water, a water-soluble organic solvent, or a mixed solvent thereof. It is preferable that water, a water-soluble organic solvent, or a mixed solvent thereof is preferably contained at 50% by mass or more in the whole solvent, and, in particular, preferably contained at 70% by mass or more, more preferably contained at 80% by mass or more, even more preferably contained at 90% by mass or more, and still even more preferably contained at 95% by mass or more. As water, a water-soluble organic solvent, or a mixed solvent thereof is contained in that range, more excellent dispersion stability of the resin can be obtained. Furthermore, water to be included in the water-soluble solvent does not contain various kinds of ions, and it is preferable to use deionized water such as ion exchange water, distilled water, or ultra-pure water.

Examples of the water-soluble organic solvent include alkyl alcohols with carbon atom number of 1 to 5 such as methyl alcohol, ethyl alcohol, n-propyl alcohol, isopropyl alcohol, n-butyl alcohol, sec-butyl alcohol, tert-butyl alcohol, isobutyl alcohol, or n-pentanol; monovalent alcohols such as 3-methoxy-3-methyl-1-butanol, 3-methoxy-1-propanol, 1-methoxy-2-propanol, or 3-methoxy-n-butanol; amides such as 1-dimethylformamide, dimethylacetamide, 3-methoxypropaneamide, 3-butoxypropaneamide, N,N-dimethyl-3-methoxypropaneamide, N,N-dibutyl-3-methoxypropaneamide, N,N-dibutyl-3-butoxypropaneamide, or N,N-dimethyl-3-butoxypropaneamide; ketones or ketoalcohols such as acetone or diacetone alcohol; ethers such as tetrahydrofuran or dioxane; an oxyethylene or oxypropylene copolymer such as polyethylene glycol or polypropylene glycol; diols such as ethylene glycol, propylene glycol, diethylene glycol, dipropylene glycol, 1,3-propanediol, isobutylene glycol, triethylene glycol, tripropylene glycol, tetraethylene glycol, 1,3-propanediol, 2-methyl-1,2-propanediol, 2-methyl-1,2-propanediol, 1,2-butanediol, 1,3-butanediol, 1,4-butanediol, 1,2-pentanediol, 1,2-hexanediol, 1,5-pentanediol, 1,6-hexanediol, 2-methyl-2,4-pentanediol, 3-methyl-1,3-butanediol, 3-methyl-1,5-pentanediol, or 2-methyl-2,4-pentanediol; triols such as glycerin, trimethylolethane, trimethylolpropane, or 1,2,6-hexanetriol; tetravalent alcohols such as mesoerythritol or pentaerythritol; monoalkyl ethers such as ethylene glycol monomethyl (or ethyl, isopropyl, n-butyl, isobutyl, n-hexyl, 2-ethylhexyl) ether, diethylene glycol monomethyl (or ethyl, isopropyl, n-butyl, isobutyl, n-hexyl, 2-ethylhexyl) ether, triethylene glycol monomethyl (or ethyl, isopropyl, n-butyl, isobutyl) ether, propylene glycol monomethyl (or ethyl, isopropyl, n-butyl, isobutyl) ether, or dipropylene glycol monomethyl (or ethyl, isopropyl, n-butyl, isobutyl) ether; dialkyl ethers of polyvalent alcohol such as diethylene glycol dimethyl ether, diethylene glycol diethyl ether, diethylene glycol ethyl methyl ether, triethylene glycol dimethyl ether, triethylene glycol diethyl ether, tetraethylene glycol dimethyl ether, tetraethylene glycol diethyl ether, propylene glycol dimethyl ether, propylene glycol diethyl ether, dipropylene glycol dimethyl ether, or dipropylene glycol diethyl ether; alkanolamines such as monoethanolamine, diethanolamine, triethanolamine, N-methylethanolamine, N-ethylethanolamine, N-butylethanolamine, N-methyldiethanolamine, N-ethyldiethanolamine, or N-butyldiethanolamine; nitrogen-containing heterocyclic compounds such as N-methyl-2-pyrrolidone, 2-pyrrolidone, or 1,3-dimethyl-2-imidazolidinone; and a cyclic compound such as γ-butyrolactone or sulfolane.

When a water-soluble organic solvent is contained in the water-soluble solvent, in particular, when the receptive solution is ink-jet ejected, it is preferable to contain those having higher boiling point than water, i.e., solvent having boiling point higher than 100° C., as water-soluble organic solvent. Among them, it is preferable to contain a solvent having boiling point of 150° C. or higher, and it is particularly preferable to contain a solvent having boiling point of 180° C. or higher. That is because, in case of ink-jet ejection of the receptive solution in particular, it is possible to suppress, in the receptive solution adhered to a nozzle or in a fine tube inside an ink-jet head, the increased viscosity of the receptive solution as caused by evaporation of the water-soluble organic solvent in an ink composition, and also prevent the breakage of an ink-jet head as caused by clogging of a nozzle or a tube. In addition, that is because the receptive solution having good fluidity and also good continuous ejection property or good ejection property after standing can be obtained, as a result. The water-soluble organic solvent having higher boiling point than water is contained preferably at 10% by mass or more, more preferably at 20% by mass or more, and even more preferably at 30% by mass or more in the whole water-soluble organic solvents.

Furthermore, when the boiling point of the water-soluble organic solvent is excessively high, a great amount of energy is required for drying and also a long period of time is required for drying, and thus it is difficult to cope with the high speed continuous printing. Due to this reason, the boiling point of the water-soluble organic solvent is preferably 300° C. or lower.

When printing is made on a low absorbing substrate and a non-absorbing substrate, it is preferable that content of a low volatile solvent is suppressed as the solvent is not likely to permeate the inside of a substrate, and it is preferable that the content of a water-soluble organic solvent having boiling point of 250° C. or higher is less than 5 parts by mass relative to 100 parts by mass of the receptive solution. Furthermore, it is more preferable that a water-soluble organic solvent having boiling point of 280° C. or higher is substantially not contained. Furthermore, the expression that a "water-soluble organic solvent having boiling point of 280° C. or higher is substantially not contained" means that the solvent is less than 1 part by mass relative to 100 parts by mass of the receptive solution.

Examples of the water-soluble organic solvent having boiling point of 280° C. or higher include triethylene glycol (boiling point: 285° C.), tetraethylene glycol (boiling point: 314° C.), glycerin (boiling point: 290° C.), 1,2,6-hexanetriol, trimethylolethane, trimethylolpropane, diglycerin, polyethylene glycol, and polypropylene glycol.

Examples of the water-soluble organic solvent having boiling point of 250° C. or higher but lower than 280° C. include tripropylene glycol (boiling point: 268° C.), tripropylene glycol monobutyl ether (boiling point: 274° C.), triethylene glycol monobutyl ether (boiling point: 271° C.), diethylene glycol mono-2-ethylhexyl ether (boiling point: 272° C.), 1,6-hexanediol (boiling point: 250° C.), and 3-methyl-1,5-pentanediol (boiling point: 250° C.)

Examples of the water-soluble organic solvent having boiling point of 200° C. or higher but lower than 250° C. include dipropylene glycol (boiling point: 232° C.), diethylene glycol (boiling point: 244° C.), tripropylene glycol monomethyl ether (boiling point: 242° C.), diethylene glycol monobutyl ether (boiling point: 231° C.), triethylene glycol monomethyl ether (boiling point: 249° C.), diethylene glycol monoisopropyl ether (boiling point: 207° C.), ethylene glycol mono-2-ethylhexyl ether (boiling point: 229° C.), ethylene glycol monohexyl ether (boiling point: 208° C.), dipropylene glycol monopropyl ether (boiling point: 212° C.), dipropylene glycol monobutyl ether (boiling point: 229° C.), dipropylene glycol monomethyl ether acetate (boiling point: 209° C.), diethylene glycol monobutyl ether acetate (boiling point: 247° C.), 1,3-propanediol (boiling point: 214° C.), 1,3-butanediol (boiling point: 208° C.), 1,4-butanediol (boiling point: 230° C.), 1,2-pentanediol (boiling point: 210° C.), 1,2-hexanediol (boiling point: 223° C.), 1,5-pentanediol (boiling point: 242° C.), 1,6-hexanediol (boiling point: 250° C.), 2,2,4-trimethyl-1,3-pentanediol (boiling point: 232° C.), 3-methyl-1,3-butanediol (boiling point: 203° C.), 2-methyl-1,3-pentanediol (boiling point: 214° C.), and 2-ethyl-1,3-hexanediol (boiling point: 244° C.)

Examples of the water-soluble organic solvent having boiling point of 180° C. or higher but lower than 200° C. include ethylene glycol (boiling point: 197° C.), propylene glycol (boiling point: 187° C.), 1,2-butanediol (boiling point: 193° C.), and 2-methyl-2,4-pentanediol (boiling point: 198° C.).

As for the water to be contained in the water-soluble water, it is preferable to use deionized water instead of water containing various kinds of ions. The content of water is not particularly limited, as long as each component can be dispersed or dissolved, but it is preferably within a range of 10% by mass or more in the water-soluble solvent, and, in particular, it is preferably within a range of 20% by mass or more, and particularly preferably within a range of 30% by mass or more. In the water-soluble solvent, it is preferably within a range of 95% by mass or less, and, in particular, it is more preferably within a range of 95% by mass or less and more preferably within a range of 90% by mass or less, in particular.

Furthermore, the content of the water-soluble organic solvent is preferably within a range of 5% by mass or more in the water-soluble solvent, and, in particular, it is preferably within a range of 80% by mass or less, and particularly preferably within a range of 70% by mass or less. Furthermore, the content of the water-soluble organic solvent is preferably within a range of 90% by mass or less in the water-soluble solvent, and, in particular, it is preferably within a range of 80% by mass or less, and particularly preferably within a range of 70% by mass or less.

That is because, as the content of water and water-soluble organic solvent is within the aforementioned range, a favorable moisture-retaining property is yielded so that less nozzle clogging or the like can be obtained. In addition, easier ejection by an ink-jet head or the like can be obtained.

[Other Components]

The receptive solution may additionally contain conventionally known additives, if necessary. Examples of the additives include a viscosity modifier, a pH controlling agent, a surface tension controlling agent, an anti-oxidizing agent, a preservative, and an anti-fungal agent.

[Surface Tension of Receptive Solution]

The surface tension of the receptive solution is preferably 35.0 mN/m or less, more preferably 32.0 mN/m or less, and even more preferably 30.0 mN/m or less, from the viewpoint of wettability to the recording medium surface and miscibility with an ink composition. In the case of application on a non-absorbing substrate, in particular, it is preferably 26.0 mN/m or less. In the case of ejection of the receptive solution by an ink-jet method, it is preferable to set the surface tension of the receptive solution to 18.0 mN/m or more, and more preferably 19.5 mN/m or more from the viewpoint of having favorable ejection stability of the receptive solution from the ejection head. The surface tension of the receptive solution can be adjusted by appropriately selecting the above-mentioned water-soluble solvent and the above-mentioned surfactant. Furthermore, the surface tension in the present invention is a value measured by the Wilhelmy method (Model: CBVP-Z manufactured by Kyowa Interface Science Co., LTD.) at a measurement temperature of 25° C.

<Ink Set for Ink-Jet Recording>

For the ink-jet recording method of the present embodiment, an ink set for ink-jet recording in which the receptive solution of the aforementioned embodiment and an ink composition are combined can be used.

<Ink Composition>

As an ink composition of the present embodiment, an ink-jet ink containing a color material, a resin, and a solvent, in which the solvent contains at least a water-soluble solvent, is used, and, within the effects of the present invention are not impaired, other components may be also contained, if necessary.

[Color Material]

The color material of the present embodiment is not particularly limited, and it may be either a dye-based or a pigment-based. It is preferable to use a pigment-based ink composition that can provide a printed material with favorable resistance such as water resistance and light resistance. In the present embodiment, the pigment which may be used for an ink composition is not particularly limited. An organic pigment or an inorganic pigment conventionally used for an ink composition can be mentioned. They may be used either singly or in combination of two or more types thereof. Specific examples of the organic pigment include an insoluble azo pigment, a soluble azo pigment, derivatives from dyes, a phthalocyanine-based organic pigment, a quinacridone-based organic pigment, a perylene-based organic pigment, a dioxazine-based organic pigment, a nickel azo-based pigment, an isoindolinone-based organic pigment, a pyranthrone-based organic pigment, a thioindigo-based organic pigment, a condensed azo-based organic pigment, a benzimidazolone-based organic pigment, a quinophthalone-based organic pigment, an isoindoline-based organic pigment, an organic solid pigment such as a quinacridone-based solid pigment and a perylene-based solid pigment, and, as other pigment, a carbon black or the like.

Content of the pigment which can be used in an ink composition in the present embodiment is not particularly limited as long as a desire image can be formed, and it is appropriately adjusted. Specifically, although it may vary depending on a type of a pigment, the content is preferably within a range of 0.05% by mass or more, and more preferably within a range of 0.1% by mass or more relative to the whole ink composition. The content is preferably within a range of 20% by mass or less, and more preferably within a range of 10% by mass or less relative to the whole ink composition. As the content of the pigment is within a range of 20% by mass or less, excellent balance between the dispersion stability and coloring power of a pigment can be obtained.

The pigment which can be used in the present embodiment may be a pigment dispersion obtained by dispersing a pigment in a water-soluble solvent with a pigment-dispersing resin, or a pigment dispersion which is a self-dispersing pigment obtained by modifying a hydrophilic group directly on a surface of the pigment. Herein, the pigment-dispersing resin means a water-soluble resin which adheres to a part of a surface of a pigment and thereby improves dispersion property of the pigment in an ink composition. The water-soluble resin means a resin which is dissolved in an amount of 1 part by mass or more in 100 parts by mass of water at 25° C. under 1 atm. By making the pigment-dispersing resin which is a water-soluble resin get adhered to a part of a surface of a pigment, dispersion property of the pigment in an ink composition is improved, and thus a high-gloss image can be obtained. In the present embodiment, the pigment that can be used for an ink composition may be a combination of a plurality of organic pigments and inorganic pigments, or a combination of a pigment dispersion dispersed in a water-soluble solvent by a pigment-dispersing resin and a self-dispersing pigment.

The pigment-dispersing agent for the pigment which can be used in an ink composition of the present embodiment is not particularly limited. For example, a surfactant such as a cationic-based, an anionic-based, a non-ionic based, an amphiphilic, a silicone (silicon)-based, and a fluorine-based can be used. Among the surfactants, the polymer surfactant (polymer dispersing agent) as exemplified in the followings is preferable.

[Resin]

In the present embodiment, the resin used for an ink composition is to promote fixing of a pigment on a surface of a recording medium. From the viewpoint of having excellent fixing property and excellent water resistance of a printed material, the resin is preferably a resin emulsion, and it may be the same as the receptive solution.

[Water-Soluble Solvent]

In the present embodiment, as the water-soluble solvent used in an ink composition, water and a water-soluble organic solvent can be mentioned. The water-soluble organic solvent may be the same as the water-soluble organic solvent which has been exemplified for the receptive solution of the embodiment described in the above. Water and water-soluble organic solvent may be used either singly, or as a mixture thereof.

[Other Components]

The ink composition of the present embodiment may additionally contain conventionally known additives, if necessary. Examples of the additives include a surfactant, a wax emulsion, a viscosity modifier, a pH controlling agent, a surface tension controlling agent, an anti-oxidizing agent, a preservative, and an anti-fungal agent.

[Method for Preparing Ink]

The method for preparing an ink composition which can be used for the ink set of the present embodiment is not particularly limited. For example, a method for preparing by adding a self-dispersing pigment, a resin, a surfactant, and, if necessary, other components, to a water-soluble solvent, a method for preparing by adding and dispersing a pigment and a dispersing agent in a water-soluble solvent followed by adding a resin, a surfactant, and, if necessary, other components, and a method for preparing by adding a pigment, a resin, a surfactant, and, if necessary, other components to a water-soluble solvent followed by dispersing the pigment can be mentioned.

<Method for Ejecting (Applying) Receptive Solution>

The ejection method or applying method using the receptive solution or ink set of the above embodiment (hereinbelow, the method may be also simply described as an "ejection method" or "applying method") is not particularly limited. Examples of the ejection method and applying method include a spray method, a coater method, an ink-jet method, a gravure method, and a flexographic method. Among them, the ejection and application is preferably made by an ink-jet method. According to the ink-jet method, the application can be easily made either on an arbitrary site or on an entire surface of a printed material.

Furthermore, according to the receptive solution of the above embodiment, a compound that is not soluble in a solvent of the receptive solution does not precipitate from the anions of an organic substance included in the receptive solution. Due to this reason, the ink-jet ejection is not impeded by the precipitation of a compound that is not soluble in a solvent of the receptive solution. As such, the receptive solution of the embodiment is preferably ejected by an ink-jet method.

Furthermore, when the receptive solution of the above embodiment is applied on a recording medium and then the above ink composition is applied on a surface of a recording medium on top of the receptive solution, the ink composition is preferably ejected while the receptive solution on top of the recording medium is present as a liquid on a surface of the recording medium. As the ejection is made while the receptive solution is present as a liquid, repulsion of the ejected ink composition, which is caused by drying•solidification of the resin emulsion, can be suppressed. Furthermore, when the receptive solution is present as a liquid on a surface of a substrate, the fixing property of an ink composition can be enhanced without having a resin layer resulting from drying·solidification of the resin emulsion is dissolved again by a solvent contained in the ink composition. Furthermore, the expression "receptive solution is present as a liquid on a surface of the recording medium" means a state in which the receptive solution is present on a surface of the recording medium while it maintains fluidity without being dried·solidified.

As the ejection method is an ink-jet method, it is possible to have high-speed ejection of the receptive solution and ink composition at any arbitrary site on a recording medium. Due to this reason, in order to have ejection of the above ink composition while the receptive solution is present as a liquid on a surface of the recording medium, the ejection method is most preferably an ink-jet method.

[Recording Medium]

For the ink-jet recording method, the recording medium is not particularly limited, and all of an absorbing substrate, a low absorbing substrate, and a non-absorbing substrate can be suitably used. Examples of the absorbing substrate include uncoated paper such as woody paper, medium-quality paper, high-quality paper, or copy paper (PCC); and a fabric such as cotton, a chemical fiber fabric, silk, hemp, or a nonwoven fabric. Furthermore, the absorption property of a recording medium can be tested by JAPAN TAPPI Paper Pulp Test Method No. 51-87 or the like, for example. The uncoated paper has a high absorption property because it is not applied with a coating agent for lowering penetration and absorption of an ink composition.

Herein, the term "low absorbing substrate" or "non-absorbing substrate" described in the present specification indicates a recording medium which has water absorption amount of 10 mL/m$^2$ or less from the start of contact to 30 msec according to Bristow method. The Bristow method is most widely used as a method of measuring a liquid absorption amount within a short time, and it is also employed by Japan Technical Association of the Pulp and Paper Industry (JAPAN TAPPI). Details of the test method are described in "Paper and Cardboard—Method for testing liquid absorption—Bristow method" of Standard 51 of "Method for testing paper and pulp by JAPAN TAPPI, edition of year 2000."

Examples of the low absorbing substrate include coated paper such as slightly coated paper, lightweight coated paper, coated paper, art paper, or cast paper. The coated paper is obtained by applying a coating agent prepared by adding a white pigment or a binder component to improve surface smoothness, and absorption or penetration of an ink composition into the coated paper does not easily occur. Examples of the non-absorbing substrate include a plastic film such as a polyester resin, a polypropylene resin, a vinyl chloride resin, a polyimide resin, or the like; metal, metallized paper, glass, synthetic rubber, natural rubber, and leather, but it is not limited thereto. The receptive solution of the present embodiment can be used suitably even when a low absorbing substrate having a low ink composition penetration property or a non-absorbing substrate is used. The ink-jet recording method makes it possible to obtain a clear image having no color unevenness and having suppressed color bleeding.

[Printing Device]

When an ink-jet recording device allowing recording by an ink-jet method is used, the receptive solution and ink set of the present embodiment can be applied to an ink-jet recording device such as a piezo type, a thermal type, and an electrostatic type. Among those devices, the ink composition is preferably used for the piezo type ink-jet recording device. In a recording head of the piezoelectric type, a piezoelectric vibrator is used as a pressure generating element, and the pressure in a pressure chamber is increased or decreased by deformation of the piezoelectric vibrator to eject ink droplets. As an attempt of having further improved high image quality or enhancement of recording speed, for the recording head, an attempt of having further improved high image quality by increasing the number of recordable colors by increasing the number of nozzle arrays is made, and also an attempt of having enhancement of recording speed by increasing the number of nozzle openings constituting one nozzle array is made. In addition, to increase the number of nozzles formed in one head, an attempt of refining the nozzle is also made.

However, when the nozzles of the head are refined, flight bending and nozzle clogging easily occur by clinging and remaining ink composition. In addition, when aggregates occur in the component of the ink composition in use for a long period of time, they will become an obstacle to the flying of ink droplets, and troubles such as flight bending and nozzle clogging will occur. For this reason, the development of an ink composition for ink-jet for which stable ejection is possible without clogging occurring in the ink-jet head has been becoming a matter of considerable urgency. Therefore, the ink composition of the ink set of the present embodiment that can suppress an occurrence of aggregates and has excellent stability is suitable for a piezo-type ink-jet recording device, and it can be used for any one of a serial head type recording device and a line head type recording device.

According to the ink-jet recording method relating to the present embodiment, blurring or white spots is suppressed so that a clear image can be obtained, and also deterioration of a device can be suppressed and excellent ejection stability can be obtained.

According to the ink-jet recording method, feathering and strike-through, which become problems particularly when an absorbing substrate is used as a recording medium, can be suppressed, and also white spots and color bleeding, which become problems particularly when a low absorbing substrate or a non-absorbing substrate is used as a recording medium, can be suppressed, and thus the blurring and white spots can be suppressed regardless of a recording medium.

When an absorbing substrate such as non-coated paper is used as a recording medium, there are problems that, as the ink composition can easily penetrate the recording medium, a strike-through in which the pigment does not stay on a surface of the recording medium and the ink composition reaches even the inner side of a substrate, a color material concentration on a surface of a recording medium is low, or a clear image is not obtained as smearing easily occurs along the paper fiber and feathering easily occurs. When a low absorbing substrate or a non-absorbing substrate is used as a recording medium, it is difficult for the ink composition to penetrate, and the ink composition is rather rejected on a surface on a recording medium. As such, dots are not sufficiently spread and a printing surface is insufficiently filled with an ink composition, and thus there are problems that it is easy to have an occurrence of uneven printing or white spots. Furthermore, when a non-absorbing substrate is used as a recording medium, there are problems that the time required for drying is long, and, as the rejected ink droplets are irregularly connected to each other, it is easy to have an occurrence of blurring or unevenness.

As a result of intensive studies by the inventors of the present invention, it was found that, after applying the receptive solution of the present embodiment on a printing surface, if an ink-jet ink composition is applied before the receptive solution becomes dried, uneven printing or white spots in a low absorbing substrate or a non-absorbing substrate can be suppressed. The time point at which the receptive solution is applied on a recording medium is not particularly limited as long as the contact between an ink composition and the receptive solution is made on a recording medium, but, for effective suppression of the feathering or bleeding, the receptive solution is preferably applied immediately before ejecting an ink composition. It is believed that, by applying an ink composition before the receptive solution becomes dried, the ink composition remains wet so that it can easily spread on a surface of a recording medium and the dot diameter of an ink composition becomes large so that uneven printing or white spots disappear, and, at the same time, due to instant mixing between the receptive solution and an ink composition, the pigment dispersion state rapidly changes and the ink is fixed without having an occurrence of color bleeding.

Furthermore, in the present embodiment, it is preferable that the ink composition is ejected and applied on a recording medium in a state in which the surface of a recording medium is heated to 30° C. or higher. In the present embodiment, it is preferable that the ink composition is ejected and applied on a recording medium in a state in which the surface of a recording medium is heated to 60° C. or lower. As the surface temperature of a region of a recording medium to be applied by the ink is set at 30° C. or higher at the time of applying the ink composition, the ink composition remains wet to have favorable spreading even for a low absorbing substrate or a non-absorbing substrate, and thus it becomes possible to produce a clear printed material. Furthermore, as the surface temperature of a region of a recording medium to be applied by the ink composition is set at 60° C. or lower at the time of ejecting the ink composition, deformation of a recording medium caused by heat can be suppressed, a favorable image can be printed, and, as the clinging of the ink on a nozzle surface of an ink-jet head caused by heat is suppressed, it becomes possible to maintain the ejection stability.

<Method for Producing Printed Material>

A printed material can be also produced by using the aforementioned ink-jet recording method. For example, a method for producing a printed material including a step of applying the receptive solution of the above embodiment on a recording medium or on an ink composition containing a color material can be mentioned. By including a step of applying the receptive solution of the above embodiment, blurring or white spots in a printed material is suppressed so that a clear image can be obtained. Furthermore, the expression "applying the receptive solution of the above embodiment on a recording medium or on an ink composition containing a color material" is a concept which includes both the application of the receptive solution of the above embodiment on a recording medium and the application of the receptive solution of the above embodiment after applying an ink composition containing a color material on the recording medium. It is particularly preferable that the receptive solution is applied on a surface of a recording medium, and then the ink composition is applied on a surface of the recording medium. From the viewpoint that the receptive solution or ink composition can be easily applied on an arbitrary site and also on an entire surface of a printed material when the ejection is made by an ink-jet method, it is preferable that the receptive solution of the present embodiment and an ink composition are ejected by an ink-jet method and the receptive solution of the above embodiment and an ink composition are applied on a surface of the recording medium.

EXAMPLES

Hereinbelow, the present invention is more specifically described by Examples. However, the present invention is not limited to the following Examples.

<Preparation of Receptive Solution>

By using polyvalent metal salts, a resin (resin emulsion), a water-soluble solvent (water-soluble organic solvent, water (ion exchange water)), and a surfactant, receptive solutions of Examples and Comparative Examples were prepared as described in the following table. Number for each component means parts by mass. Furthermore, the expression "remaining" in the table means that, by adding water after incorporating each component other than water, the incorporation is made such that the receptive solution becomes 100 parts by mass as a whole.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Solvent Unit is "parts by mass" | W-1 | Remaining | Remaining | Remaining | Remaining | Remaining | Remaining | Remaining | Remaining | Remaining | Remaining |
| | S-1 | 40 | | | | | | 20 | 40 | | 10 |
| | S-2 | | 30 | | | 20 | | | 20 | | 10 |
| | S-3 | | | 35 | | 10 | 20 | | | 20 | 10 |
| | S-4 | | | | 20 | | | 5 | 10 | 10 | |
| Leveling agent Unit is "parts by mass" | l-1 | 0.5 | 0.5 | 0.5 | | | | 1 | 3 | 1 | 2 |
| | l-2 | | | | 0.5 | 0.5 | 0.5 | | | | |
| Surfactant Unit is "parts by mass" | D-1 | 2.0 | | | | | | | | | |
| | D-2 | | 1.5 | | | | | | | | |
| | D-3 | | | 2.5 | | | | | | | |
| | D-4 | | | | 1.0 | | | | | | |
| | D-5 | | | | | 3.0 | | | | | |
| | D-6 | | | | | | 3.5 | | | | |
| | D-7 | | | | | | | 2.0 | | | |
| | D-8 | | | | | | | | 3.0 | | |
| | D-9 | | | | | | | | | 4.5 | |
| | D-10 | | | | | | | | | | 2.5 |
| | D-11 | | | | | | | | | | |
| | D-12 | | | | | | | | | | |

TABLE 1-continued

|  |  |  |  |  |  |  |  |  |  |  |
|---|---|---|---|---|---|---|---|---|---|---|
|  | D-13 |  |  |  |  |  |  |  |  |  |
|  | D-14 |  |  |  |  |  |  |  |  |  |
|  | D-15 |  |  |  |  |  |  |  |  |  |
|  | D-16 |  |  |  |  |  |  |  |  |  |
|  | D-17 |  |  |  |  |  |  |  |  |  |
|  | D-18 |  |  |  |  |  |  |  |  |  |
|  | D-19 |  |  |  |  |  |  |  |  |  |
|  | D-20 |  |  |  |  |  |  |  |  |  |
|  | D-21 |  |  |  |  |  |  |  |  |  |
|  | D-22 |  |  |  |  |  |  |  |  |  |
|  | D-23 |  |  |  |  |  |  |  |  |  |
|  | D-24 |  |  |  |  |  |  |  |  |  |
| Resin | E-1 | 7.0 |  |  |  |  |  | 9.0 | 9.0 | 9.0 |  |
| Unit is "parts | E-2 |  |  | 10 | 5.0 |  |  |  |  |  | 6.0 |
| by mass" | E-3 |  | 7.0 |  |  | 7.0 | 9.0 |  |  |  |  |
| Polyvalent | B-1 |  |  |  |  | 0.7 |  | 0.7 | 0.7 |  |  |
| metal ions | B-2 | 0.6 | 0.6 | 0.6 | 0.3 |  | 0.6 |  |  | 1.2 | 0.6 |
| Polyvalent metal ions "mol/l" |  | 0.10 | 0.10 | 0.10 | 0.05 | 0.10 | 0.10 | 0.10 | 0.10 | 0.20 | 0.10 |
| Anions of | A-1 | 1.2 |  |  |  |  |  |  |  |  |  |
| organic | A-2 |  | 2.8 |  |  |  |  |  |  |  |  |
| substance | A-3 |  |  | 3.1 |  |  |  |  |  |  |  |
| Unit is "parts | A-4 |  |  |  | 1.5 |  |  |  |  |  |  |
| by mass" | A-5 |  |  |  |  | 4.4 |  |  |  |  |  |
|  | A-6 |  |  |  |  |  | 2.4 |  |  |  |  |
|  | A-7 |  |  |  |  |  |  | 1.2 |  |  |  |
|  | A-8 |  |  |  |  |  |  |  | 1.2 |  |  |
|  | A-9 |  |  |  |  |  |  |  |  | 2.6 |  |
|  | A-10 |  |  |  |  |  |  |  |  |  | 1.7 |
|  | A-11 |  |  |  |  |  |  |  |  |  |  |
|  | A-12 |  |  |  |  |  |  |  |  |  |  |
|  | A-13 |  |  |  |  |  |  |  |  |  |  |
|  | A-14 |  |  |  |  |  |  |  |  |  |  |
|  | A-15 |  |  |  |  |  |  |  |  |  |  |
|  | A-16 |  |  |  |  |  |  |  |  |  |  |
|  | A-17 |  |  |  |  |  |  |  |  |  |  |
|  | OV/IV | 0.27 | 0.53 | 0.38 | 0.38 | 0.29 | 0.85 | 0.27 | 0.26 | 0.33 | 0.53 |
|  | Evaluation1 | ○ | ◎ | ○ | Δ | Δ | ◎ | Δ | Δ | ○ | ◎ |
|  | Evaluation2 | B | A | A | A | B | A | B | B | B | A |

|  |  | Example 11 | Example 12 | Example 13 | Example 14 | Example 15 | Example 16 | Example 17 | Example 18 | Example 19 |
|---|---|---|---|---|---|---|---|---|---|---|
| Solvent Unit is "parts by mass" | W-1 | Remaining | Remaining | Remaining | Remaining | Remaining | Remaining | Remaining | Remaining | Remaining |
|  | S-1 |  | 10 |  |  |  | 20.0 | 20.0 | 10.0 | 25.0 |
|  | S-2 | 10 | 10 | 40.0 | 25.0 |  |  |  | 10.0 |  |
|  | S-3 | 10 |  |  |  | 30.0 |  | 20.0 | 10.0 |  |
|  | S-4 | 10 | 10 |  |  | 20.0 |  |  |  |  |
| Leveling agent Unit is "parts by mass" | l-1 | 1 |  |  |  |  |  |  | 1.0 | 1.0 |
|  | l-2 |  | 1 | 1.0 | 0.5 | 1.0 | 1.0 | 3.0 |  |  |
| Surfactant Unit is "parts by mass" | D-1 |  |  |  |  |  | 3.0 |  |  |  |
|  | D-2 |  |  |  |  |  |  | 3.0 |  |  |
|  | D-3 |  |  |  |  |  |  |  | 3.0 |  |
|  | D-4 |  |  |  |  |  |  |  |  | 3.0 |
|  | D-5 |  |  |  |  |  |  |  |  |  |
|  | D-6 |  |  |  |  |  |  |  |  |  |
|  | D-7 |  |  |  |  |  |  |  |  |  |
|  | D-8 |  |  |  |  |  |  |  |  |  |
|  | D-9 |  |  |  |  |  |  |  |  |  |
|  | D-10 |  |  |  |  |  |  |  |  |  |
|  | D-11 | 3.5 |  |  |  |  |  |  |  |  |
|  | D-12 |  | 2.0 |  |  |  |  |  |  |  |
|  | D-13 |  |  | 2.0 |  |  |  |  |  |  |
|  | D-14 |  |  |  | 2.0 |  |  |  |  |  |
|  | D-15 |  |  |  |  | 2.0 |  |  |  |  |
|  | D-16 |  |  |  |  |  |  |  |  |  |
|  | D-17 |  |  |  |  |  |  |  |  |  |
|  | D-18 |  |  |  |  |  |  |  |  |  |
|  | D-19 |  |  |  |  |  |  |  |  |  |
|  | D-20 |  |  |  |  |  |  |  |  |  |
|  | D-21 |  |  |  |  |  |  |  |  |  |
|  | D-22 |  |  |  |  |  |  |  |  |  |
|  | D-23 |  |  |  |  |  |  |  |  |  |
|  | D-24 |  |  |  |  |  |  |  |  |  |

TABLE 1-continued

|  |  | (col 1) | (col 2) | (col 3) | (col 4) | (col 5) | (col 6) | (col 7) | (col 8) | (col 9) |
|---|---|---|---|---|---|---|---|---|---|---|
| Resin Unit is "parts by mass" | E-1 |  |  |  |  |  |  | 7.0 | 8.0 | 6.0 |
|  | E-2 | 7.0 | 6.0 |  |  |  |  |  |  |  |
|  | E-3 |  |  | 9.0 | 9.0 | 9.0 | 9.0 |  |  |  |
| Polyvalent metal ions | B-1 |  |  |  | 0.7 |  |  |  |  |  |
|  | B-2 | 0.1 | 0.6 | 0.6 |  | 0.6 | 0.6 | 0.6 | 0.6 | 2.4 |
| Polyvalent metal ions "mol/l" |  | 0.01 | 0.10 | 0.10 | 0.10 | 0.10 | 0.10 | 0.10 | 0.10 | 0.40 |
| Anions of organic substance Unit is "parts by mass" | A-1 |  |  | 1.2 |  |  |  |  |  |  |
|  | A-2 |  |  |  | 2.8 |  |  |  |  |  |
|  | A-3 |  |  |  |  | 3.1 |  |  |  |  |
|  | A-4 |  |  |  |  |  | 3.1 |  |  |  |
|  | A-5 |  |  |  |  |  |  | 4.4 |  |  |
|  | A-6 |  |  |  |  |  |  |  | 2.4 |  |
|  | A-7 |  |  |  |  |  |  |  |  | 4.8 |
|  | A-8 |  |  |  |  |  |  |  |  |  |
|  | A-9 |  |  |  |  |  |  |  |  |  |
|  | A-10 |  |  |  |  |  |  |  |  |  |
|  | A-11 | 0.1 |  |  |  |  |  |  |  |  |
|  | A-12 |  | 2.3 |  |  |  |  |  |  |  |
|  | A-13 |  |  |  |  |  |  |  |  |  |
|  | A-14 |  |  |  |  |  |  |  |  |  |
|  | A-15 |  |  |  |  |  |  |  |  |  |
|  | A-16 |  |  |  |  |  |  |  |  |  |
|  | A-17 |  |  |  |  |  |  |  |  |  |
| OV/IV |  | 0.39 | 1.1 | 0.27 | 0.53 | 0.38 | 0.38 | 0.29 | 0.85 | 0.27 |
| Evaluation1 |  | ○ | Δ | Δ | ⊚ | ○ | ○ | Δ | ⊚ | Δ |
| Evaluation2 |  | A | B | B | A | A | A | B | A | B |

TABLE 2

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Solvent Unit is "parts by mass" | W-1 | Remaining | Remaining | Remaining | Remaining | Remaining | Remaining | Remaining | Remaining |
|  | S-1 | 15.0 | 15.0 | 10.0 |  | 20.0 | 20 | 20 | Remaining |
|  | S-2 | 15.0 |  |  | 35.0 |  |  |  |  |
|  | S-3 |  | 30.0 | 20.0 |  | 10.0 |  |  | 30 |
|  | S-4 | 5.0 |  |  |  | 5.0 | 20 | 20 |  |
| Leveling agent Unit is "parts by mass" | l-1 | 1.0 | 1.0 |  |  | 1.0 | 1.5 | 1.0 | 1.0 |
|  | l-2 |  |  | 2.0 | 1.0 |  |  |  |  |
| Surfactant Unit is "parts by mass" | D-1 |  |  |  |  |  |  |  |  |
|  | D-2 |  |  |  |  |  |  |  |  |
|  | D-3 |  |  |  |  |  |  |  |  |
|  | D-4 |  |  |  |  |  |  |  |  |
|  | D-5 |  |  |  |  |  |  |  |  |
|  | D-6 |  |  |  |  |  |  |  |  |
|  | D-7 |  |  |  |  |  |  |  |  |
|  | D-8 |  |  |  |  |  |  |  |  |
|  | D-9 |  |  |  |  |  |  |  |  |
|  | D-10 |  |  |  |  |  |  |  |  |
|  | D-11 |  |  |  |  |  |  |  |  |
|  | D-12 |  |  |  |  |  |  |  |  |
|  | D-13 |  |  |  |  |  |  |  |  |
|  | D-14 |  |  |  |  |  |  |  |  |
|  | D-15 |  |  |  |  |  |  |  |  |
|  | D-16 | 2.0 |  |  |  |  |  |  |  |
|  | D-17 |  | 1.5 |  |  |  |  |  |  |
|  | D-18 |  |  | 2.5 |  |  |  |  |  |
|  | D-19 |  |  |  | 1.0 |  |  |  |  |
|  | D-20 |  |  |  |  | 3.0 |  |  |  |
|  | D-21 |  |  |  |  |  | 3.5 |  |  |
|  | D-22 |  |  |  |  |  |  | 2.0 |  |
|  | D-23 |  |  |  |  |  |  |  | 3.0 |
|  | D-24 |  |  |  |  |  |  |  |  |
| Resin Unit is "parts by mass" | E-1 | 9.0 |  |  | 9.0 | 9.0 | 9.0 | 9.0 |  |
|  | E-2 |  | 6.0 |  |  |  |  |  | 9.0 |
|  | E-3 |  |  | 9.0 |  |  |  |  |  |
| Polyvalent metal ions | B-1 | 0.70 | 0.70 | 0.70 | 0.70 | 0.70 |  |  |  |
|  | B-2 |  |  |  |  |  | 0.60 | 0.60 | 0.60 |
| Polyvalent metal ions "mol/l" |  | 0.10 | 0.10 | 0.10 | 0.10 | 0.10 | 0.10 | 0.10 | 0.10 |

TABLE 2-continued

|  |  |  |  |  |  |  |  |  |
|---|---|---|---|---|---|---|---|---|
| Anions of organic substance Unit is "parts by mass" | A-1 |  |  |  |  |  |  |  |
|  | A-2 |  |  |  |  |  |  |  |
|  | A-3 | 3.1 |  |  |  |  |  |  |
|  | A-4 |  | 3.1 |  |  |  |  |  |
|  | A-5 |  |  | 4.4 |  |  |  |  |
|  | A-6 |  |  |  | 2.4 |  |  |  |
|  | A-7 |  |  |  |  | 1.2 |  |  |
|  | A-8 |  |  |  |  |  | 1.2 |  |
|  | A-9 |  |  |  |  |  |  | 1.3 |  |
|  | A-10 |  |  |  |  |  |  |  | 1.7 |
|  | A-11 |  |  |  |  |  |  |  |  |
|  | A-12 |  |  |  |  |  |  |  |  |
|  | A-13 |  |  |  |  |  |  |  |  |
|  | A-14 |  |  |  |  |  |  |  |  |
|  | A-15 |  |  |  |  |  |  |  |  |
|  | A-16 |  |  |  |  |  |  |  |  |
|  | A-17 |  |  |  |  |  |  |  |  |
|  | OV/IV | 0.38 | 0.38 | 0.29 | 0.85 | 0.27 | 0.26 | 0.33 | 0.53 |
|  | Evaluation1 | X | X | X | X | X | X | X | X |
|  | Evaluation2 | C | C | C | C | C | C | C | C |

|  |  | Comparative Example 9 | Comparative Example 10 | Comparative Example 11 | Comparative Example 12 | Comparative Example 13 | Comparative Example 14 | Comparative Example 15 |
|---|---|---|---|---|---|---|---|---|
| Solvent Unit is "parts by mass" | W-1 | Remaining | Remaining | Remaining | Remaining | Remaining | Remaining | Remaining |
|  | S-1 | 20 | 10.0 |  | 10.0 |  | 10 | 10 |
|  | S-2 |  |  | 35.0 |  | 25 | 10 |  |
|  | S-3 |  | 20.0 |  |  |  | 10 | 20 |
|  | S-4 | 20 |  |  |  |  |  |  |
| Leveling agent Unit is "parts by mass" | l-1 | 1.0 | 2.5 | 1.0 | 1.0 | 1.0 | 1.0 | 1.0 |
|  | l-2 |  |  |  |  |  |  |  |
| Surfactant Unit is "parts by mass" | D-1 |  |  |  |  |  |  |  |
|  | D-2 |  |  |  |  |  | 2.0 |  |
|  | D-3 |  |  |  |  |  |  |  |
|  | D-4 |  |  |  |  |  | 2.0 |  |
|  | D-5 |  |  |  |  |  |  |  |
|  | D-6 |  |  |  |  |  |  | 2.0 |
|  | D-7 |  |  |  |  |  |  |  |
|  | D-8 |  |  |  |  |  |  |  |
|  | D-9 |  | 2.0 |  |  |  |  |  |
|  | D-10 |  |  | 2.0 |  |  |  |  |
|  | D-11 |  |  |  | 2.0 |  |  |  |
|  | D-12 |  |  |  |  |  |  |  |
|  | D-13 |  |  |  |  |  |  |  |
|  | D-14 |  |  |  |  |  |  |  |
|  | D-15 |  |  |  |  |  |  |  |
|  | D-16 |  |  |  |  |  |  |  |
|  | D-17 |  |  |  |  |  |  |  |
|  | D-18 |  |  |  |  |  |  |  |
|  | D-19 |  |  |  |  |  |  |  |
|  | D-20 |  |  |  |  |  |  |  |
|  | D-21 |  |  |  |  |  |  |  |
|  | D-22 |  |  |  |  |  |  |  |
|  | D-23 |  |  |  |  |  |  |  |
|  | D-24 | 3.0 |  |  |  |  |  |  |
| Resin Unit is "parts by mass" | E-1 |  |  |  |  |  |  |  |
|  | E-2 | 7.0 | 9.0 | 9.0 |  |  |  |  |
|  | E-3 |  |  |  | 9.0 | 9.0 | 9.0 | 9.0 |
| Polyvalent metal ions | B-1 | 0.70 | 0.70 | 0.70 | 0.70 |  |  | 0.70 |
|  | B-2 |  |  |  |  | 0.60 | 0.60 |  |
| Polyvalent metal ions "mol/l" |  | 0.10 | 0.10 | 0.10 | 0.10 | 0.10 | 0.10 | 0.10 |
| Anions of organic substance Unit is "parts by mass" | A-1 |  |  |  |  |  |  |  |
|  | A-2 |  |  |  |  |  |  |  |
|  | A-3 |  |  |  |  |  |  |  |
|  | A-4 |  |  |  |  |  |  |  |
|  | A-5 |  |  |  |  |  |  |  |
|  | A-6 |  |  |  |  |  |  |  |
|  | A-7 |  |  |  |  |  |  |  |
|  | A-8 |  |  |  |  |  |  |  |
|  | A-9 |  |  |  |  |  |  |  |
|  | A-10 |  |  |  |  |  |  |  |
|  | A-11 | 1.4 |  |  |  |  |  |  |
|  | A-12 |  |  |  |  |  |  |  |
|  | A-13 |  | 1.3 | 1.3 |  |  |  |  |
|  | A-14 |  |  |  | 1.5 |  |  |  |

TABLE 2-continued

|      |      |      |      |      |      |      |     |
|------|------|------|------|------|------|------|-----|
| A-15 |      |      |      |      | 1.3  |      |     |
| A-16 |      |      |      |      |      | 1.3  |     |
| A-17 |      |      |      |      |      |      | 3.4 |
| OV/IV | 0.39 | 0.22 | 0.22 | 0.16 | 0.20 | 0.22 | 1.3 |
| Evaluation1 | X | X | X | X | X | X | X |
| Evaluation2 | C | C | C | C | C | C | C |

In the table, "W-1" means water (ion exchange water).

In the table, "S-1" means 1,2-butanediol.

In the table, "S-2" means 1,2-pentanediol.

In the table, "S-3" means 1,2-hexanediol.

In the table, "1-1" indicates BYK-349 (polysiloxane-based surfactant manufactured by BYK-Chemie GmbH).

In the table, "1-2" indicates TEGO Twin 4000 (polysiloxane-based surfactant manufactured by Evonik Degussa GmbH).

In the table, "D-1" indicates EMULGEN A-60 (distyrenylated phenyl ether manufactured by Kao Corporation, in the formula, A=2, $R_1$="—CH(CH$_3$)—", $R_2$="—H", $R_3$="—H", X=ethylene oxide, HLB value=12.8), and it is a surfactant included in the formula (1).

In the table, "D-2" indicates EMULGEN A-90 (distyrenylated phenyl ether manufactured by Kao Corporation, in the formula, A=2, $R_1$="—CH(CH$_3$)—", $R_2$="—H", $R_3$="—H", X=ethylene oxide, HLB value=14.5), and it is a surfactant included in the formula (1).

In the table, "D-3" indicates EMULGEN B-66 (tribenzylphenyl ether manufactured by Kao Corporation, in the formula, A=3, $R_1$="—CH$_2$—", $R_2$="—H", $R_3$="—H", X=ethylene oxide, HLB value=13.2), and it is a surfactant included in the formula (1).

In the table, "D-4" indicates NEWCOL 2604 (tristyrenylated phenyl ether manufactured by NIPPON NYUKAZAI CO., LTD., in the formula, A=3, $R_1$="—CH(CH$_3$)—", $R_2$="—H", $R_3$="—H", X=ethylene oxide, HLB value=9), and it is a surfactant included in the formula (1).

In the table, "D-5" indicates BLAUNON TSP-7.5 (manufactured by AOKI OIL INDUSTRIAL Co., Ltd., in the formula, A=3, $R_1$="—CH(CH$_3$)—", $R_2$="—H", $R_3$="—H", X=ethylene oxide, HLB value=9.2, n=7.5), and it is a surfactant included in the formula (1).

In the table, "D-6" indicates EMULSOGEN TS100 (tristyrenylated phenyl ether manufactured by Clariant GmbH, in the formula, A=3, $R_1$="—CH(CH$_3$) —", $R_2$="—H", $R_3$="—H", X=ethylene oxide, HLB value=10, n=10), and it is a surfactant included in the formula (1).

In the table, "D-7" indicates NEWCOL 2607 (tristyrenylated phenyl ether manufactured by NIPPON NYUKAZAI CO., LTD., in the formula, A=3, $R_1$="—CH(CH$_3$)—", $R_2$="—H", $R_3$="—H", X=ethylene oxide or propylene oxide, HLB value=11.2), and it is a surfactant included in the formula (1).

In the table, "D-8" indicates NEWCOL 2609 (tristyrenylated phenyl ether manufactured by NIPPON NYUKAZAI CO., LTD., in the formula, A=3, $R_1$="—CH(CH$_3$)—", $R_2$="—H", $R_3$="—H", X=ethylene oxide or propylene oxide, HLB value=12.6), and it is a surfactant included in the formula (1).

In the table, "D-9" indicates BLAUNON KTSP-16 (manufactured by AOKI OIL INDUSTRIAL Co., Ltd., in the formula, A=3, $R_1$="—CH(CH$_3$)—", $R_2$="—H", $R_3$="—H", X=ethylene oxide, HLB value=12.7, n=16), and it is a surfactant included in the formula (1).

In the table, "D-10" indicates EMULSOGEN TS160 (tristyrenylated phenyl ether manufactured by Clariant GmbH, in the formula, A=3, $R_1$="—CH(CH$_3$)—", $R_2$="—H", $R_3$="—H", X=ethylene oxide, HLB value=13, n=16), and it is a surfactant included in the formula (1).

In the table, "D-11" indicates EMULSOGEN TS200 (tristyrenylated phenyl ether manufactured by Clariant GmbH, in the formula, A=3, $R_1$="—CH(CH$_3$)—", $R_2$="—H", $R_3$="—H", X=ethylene oxide, HLB value=14, n=20), and it is a surfactant included in the formula (1).

In the table, "D-12" indicates EMULSOGEN TS290 (tristyrenylated phenyl ether manufactured by Clariant GmbH, in the formula, A=3, $R_1$="—CH(CH$_3$)—", $R_2$="—H", $R_3$="—H", X=ethylene oxide, HLB value=15, n=29), and it is a surfactant included in the formula (1).

In the table, "D-13" indicates NEWCOL 2616 (tristyrenylated phenyl ether manufactured by NIPPON NYUKAZAI CO., LTD., in the formula, A=3, $R_1$="—CH(CH$_3$)—", $R_2$="—H", $R_3$="—H", X=ethylene oxide or propylene oxide, HLB value=15.5), and it is a surfactant included in the formula (1).

In the table, "D-14" indicates BLAUNON TSP-50 (manufactured by AOKI OIL INDUSTRIAL Co., Ltd., in the formula, A=3, $R_1$="—CH(CH$_3$)—", $R_2$="—H", $R_3$="—H", X=ethylene oxide, HLB value=16.9, n=50), and it is a surfactant included in the formula (1).

In the table, "D-15" indicates EMULSOGEN TS540 (tristyrenylated phenyl ether manufactured by Clariant GmbH, in the formula, A=3, $R_1$="—CH(CH$_3$)—", $R_2$="—H", $R_3$="—H", X=ethylene oxide, HLB value=17, n=54), and it is a surfactant included in the formula (1).

In the table, "D-16" indicates UNITHOX 480, which is polyoxyethylene alkyl ether manufactured by TOYO ADL CORPORATION, i.e., a compound with chemical formula of R—O—(CH$_2$CH$_2$O)$_n$—H in which R is linear alkyl ether with carbon atom number n=31 to 32, HLB value of 16, and EO modification number of 40 (n=40), and it is a surfactant not included in the formula (1).

In the table, "D-17" indicates UNITHOX 490, which is polyoxyethylene alkyl ether manufactured by TOYO ADL CORPORATION, i.e., a compound with chemical formula of R—O—(CH$_2$CH$_2$O)$_n$—H in which R is linear alkyl ether with carbon atom number n=30, HLB value of 18, and EO modification number of 90 (n=90), and it is a surfactant not included in the formula (1).

In the table, "D-18" indicates NIKKOL BPS20, which is polyoxyethylene phytosterol manufactured by Nikko Chemicals Co., Ltd., i.e., phytosterol with HLB value of 15.5 and EO modification number of 20 (n=20), and it is a surfactant not included in the formula (1).

In the table, "D-19" indicates NIKKOL BPS30, which is polyoxyethylene phytosterol manufactured by Nikko Chemicals Co., Ltd., i.e., phytosterol with HLB value of 18 and EO modification number of 30, and it is a surfactant not included in the formula (1).

In the table, "D-20" indicates SAPOGENAT T040, which is tributylphenol ethoxy acetate manufactured by Clariant GmbH with HLB value of 8 and EO modification number of 4 (n=4), and it is a surfactant not included in the formula (1).

In the table, "D-21" indicates SAPOGENAT 1060, which is tributylphenol ethoxy acetate manufactured by Clariant GmbH with HLB value of 10 and EO modification number of 6 (n=6), and it is a surfactant not included in the formula (1).

In the table, "D-22" indicates SAPOGENAT T080, which is tributylphenol ethoxy acetate manufactured by Clariant GmbH with HLB value of 11 and EO modification number of 8 (n=8), and it is a surfactant not included in the formula (1).

In the table, "D-23" indicates SAPOGENAT T110, which is tributylphenol ethoxy acetate manufactured by Clariant GmbH with HLB value of 13 and EO modification number of 11 (n=11), and it is a surfactant not included in the formula (1).

In the table, "D-24" indicates SAPOGENAT T130, which is tributylphenol ethoxy acetate manufactured by Clariant GmbH with HLB value of 14 and EO modification number of 13 (n=13), and it is a surfactant not included in the formula (1).

In the table, "E-1" indicates ACRIT AKW107 (non-ionic acryl emulsion manufactured by Taisei Fine Chemical, Co., Ltd.).

In the table, "E-2" indicates SUPERFLEX E-2000 (non-ionic urethane emulsion manufactured by DKS Co. Ltd.).

In the table, "E-3" indicates a cationic acryl emulsion which has been prepared as follows. To a flask, 65 parts by mass of ion exchange water flushed with nitrogen were added, and, subsequently, 3.5 parts by mass of a non-reactive surfactant [manufactured by Kao Corporation; product name "Emulgen 1135S-70"] were added and dissolved therein. Next, the resulting surfactant solution was maintained at 75° C. and added with dimethylaminoethyl methacrylate as a cationic monomer, and then, 2.0 parts by mass of hydrochloric acid, which has been obtained by diluting 36% hydrochloric acid with ion exchange water to have hydrochloric acid concentration of 18%, were added and sufficiently mixed to neutralize the cationic monomer. After that, 0.7 parts by mass of 14% aqueous solution of 2,2'-azobis (2-amidinopropane) was added thereto. Subsequently, continuous dropwise addition of 98 parts by mass of a mixture solution of methyl methacrylate and 2-ethyl-hexyl-acrylate (mass ratio of 69.5/27.8) was initiated such that the glass transition temperature becomes 50° C. to 60° C. Inside of the flask was maintained at 78° C.±2° C. using a water bath, and the dropwise addition of the monomer mixture solution was completed after 4 hours. After the completion of the dropwise addition of the monomer mixture solution, 0.7 parts by mass of 14% aqueous solution of 2,2'-azobis(2-aminopropane) was added, and, after allowing it to stand for 2 hours, the resultant was cooled to obtain a cationic acryl emulsion.

In the table, "B-1" indicates calcium hydroxide (compound capable of generating polyvalent metal ions).

In the table, "B-2" indicates magnesium hydroxide (compound capable of generating polyvalent metal ions).

In the table, "A-1" indicates methylmalonic acid (compound capable of generating anions of an organic substance, and OV/IV value of the anions of an organic acid is 0.27).

In the table, "A-2" indicates salicylic acid (compound capable of generating anions of an organic substance, and OV/IV value of the anions of an organic acid is 0.53).

In the table, "A-3" indicates 2,4-dihydroxybenzoic acid (compound capable of generating anions of an organic substance, and OV/IV value of the anions of an organic acid is 0.38).

In the table, "A-4" indicates 2,5-dihydroxybenzoic acid (compound capable of generating anions of an organic substance, and OV/IV value of the anions of an organic acid is 0.38).

In the table, "A-5" indicates pantothenic acid (compound capable of generating anions of an organic substance, and OV/IV value of the anions of an organic acid is 0.29).

In the table, "A-6" indicates benzoic acid (compound capable of generating anions of an organic substance, and OV/IV value of the anions of an organic acid is 0.85).

In the table, "A-7" indicates succinic acid (compound capable of generating anions of an organic substance, and OV/IV value of the anions of an organic acid is 0.27).

In the table, "A-8" indicates maleic acid (compound capable of generating anions of an organic substance, and OV/IV value of the anions of an organic acid is 0.26).

In the table, "A-9" indicates glutaric acid (compound capable of generating anions of an organic substance, and OV/IV value of the anions of an organic acid is 0.33).

In the table, "A-10" indicates suberic acid (compound capable of generating anions of an organic substance, and OV/IV value of the anions of an organic acid is 0.53).

In the table, "A-11" indicates trimellitic acid (compound capable of generating anions of an organic substance, and OV/IV value of the anions of an organic acid is 0.39).

In the table, "A-12" indicates caprylic acid (compound capable of generating anions of an organic substance, and OV/IV value of the anions of an organic acid is 1.10).

In the table, "A-13" indicates asparaginic acid (compound capable of generating anions of an organic substance, and OV/IV value of the anions of an organic acid is 0.22).

In the table, "A-14" indicates tartaric acid (compound capable of generating anions of an organic substance, and OV/IV value of the anions of an organic acid is 0.16).

In the table, "A-15" indicates malic acid (compound capable of generating anions of an organic substance, and OV/IV value of the anions of an organic acid is 0.20).

In the table, "A-16" indicates citric acid (compound capable of generating anions of an organic substance, and OV/IV value of the anions of an organic acid is 0.22).

In the table, "A-17" indicates capric acid (compound capable of generating anions of an organic substance, and OV/IV value of the anions of an organic acid is 1.3).

[Evaluation 1]

Storage Stability of Receptive Solution (Viscosity Change)

Viscosity (initial viscosity, Va) of the receptive solutions of Examples and Comparative Examples before the storage test to be described later was measured. Specifically, by using a falling-ball viscometer based on DIN EN ISO 12058-1, the initial viscosity (Va) was measured at 25° C. Then, the receptive solutions of Examples and Comparative Examples were subjected to the storage test, and the viscosity after storage test (Vb) was measured. Specifically, a sample obtained by adding about 25 ml of the receptive solutions of Examples and Comparative Examples to a transparent glass bottle with capacity of 30 ml followed by tight sealing was subjected to a storage test with temperature of 60° C. and storage period of 7 days. Then, the viscosity was measured, in the same manner as the test for measuring the initial viscosity (Va), for the receptive solutions of Examples and Comparative Examples after the storage test. The results are shown in Tables 1 and 2.

(Evaluation Criteria)

⊚ |Vb−Va|/Va×100 is less than 5%.

◯: |Vb−Va|/Va×100 is 5% or more but less than 10%.

Δ: |Vb−Va|/Va×100 is 10% or more but less than 30%.

x: |Vb−Va|/Va×100 is 30% or more, or the receptive solution of the storage test was gelified.

Furthermore, |Vb−Va| means an absolute value of a difference between Va and Vb.

[Evaluation 2]

Ejection Stability of Receptive Solution

Ejection stability was evaluated for the receptive solution of Examples and Comparative Examples. Specifically, after performing nozzle cleaning in advance, the receptive solution of Examples and Comparative Examples was filled in a 600 dpi ink-jet head, and then ejection was carried out. Thereafter, the ejection was paused for 15 minutes, and then the receptive solution of Examples and Comparative Examples was ejected again. Then, by examining any bending or the number of nozzles showing no ejection based on the following evaluation criteria, the ejection stability of the receptive solution was determined. The results are shown in Tables 1 and 2.

(Evaluation Criteria)

A: Bending or the number of nozzles showing no ejection is less than 1% in the entire nozzles.

B: Bending or the number of nozzles showing no ejection is 1% or more but less than 3% in the entire nozzles.

C: Bending or the number of nozzles showing no ejection is 3% or more in the entire nozzles.

The receptive solution of Examples has an OV/IV value of 0.25 or more but less than 1.30 in which the OV/IV value is a ratio of an organic value to an inorganic value of the anions of an organic substance contained in anions that are contained in the receptive solution, and the surfactant contained in the receptive solution contains a surfactant which is represented by the general formula (1). The receptive solution of Examples has |Vb−Va|/Va×100 of less than 30%, as it has ⊙ to Δ in Evaluation 1 of Table 1. As such, it is found that the receptive solution of the present invention has favorable storage stability.

As Evaluation 2 is A or B in the table, it is also found that the receptive solution of Examples has less than 3% of bending or the number of nozzles showing no ejection after pausing the ejection for 15 minutes and the ejection stability of the receptive solution is favorable. Furthermore, as Evaluation 2 is A in the table, the reception solution of Examples 2, 3, 4, 6, 10, 11, 14, 15, 16, and 17 in which the OV/IV value of anions of an organic substance is 0.35 or more and 1.00 or less has even more favorable ejection stability.

On the other hand, the receptive solution of each of Comparative Examples 1 to 9 described in Table 2 does not contain a surfactant represented by the general formula (1), and, due to this reason, the receptive solution is found to be a receptive solution which has poor storage stability and poor ejection stability. Furthermore, it is found that the receptive solution of each of Comparative Examples 10 to 15 described in Table 2 contains anions of an organic substance which have an OV/IV value of less than 0.25 (Comparative Examples 10 to 14) or an OV/IV value of 1.3 (Comparative Examples 15), and, due to this reason, the receptive solution is a receptive solution which has poor storage stability and poor ejection stability.

From the examples with the present test results, it was confirmed that the receptive solution of the present invention is a receptive solution which has improved storage stability and ejection stability.

The invention claimed is:

1. A receptive solution for ink-jet recording ink, comprising polyvalent metal salts, a water-soluble solvent, a resin, and a surfactant, wherein
    a resin emulsion is contained as the resin,
    the polyvalent metal salts include ions of a polyvalent metal and anions of an organic substance,
    an OV/IV value as a ratio of an organic value to an inorganic value of the anions of an organic substance is 0.25 or more but less than 1.30,
    an HLB value of the surfactant is 9 or more and 19 or less, and the surfactant is represented by the following general formula (1)

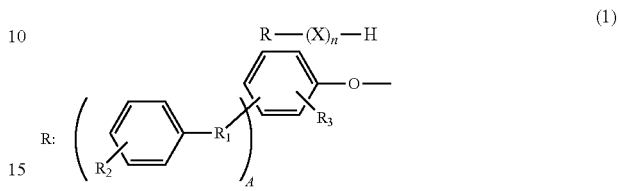

in the formula, $R_1$ represents an optionally branched alkylene group having carbon atom number of 1 or more and 5 or less, $R_2$ represents a hydrogen atom or an optionally branched alkyl group having carbon atom number of 1 or more and 3 or less, $R_3$ represents a hydrogen atom or an optionally branched alkyl group having carbon atom number of 1 or more and 3 or less, A represents 2 or 3, X represents ethylene oxide and/or propylene oxide, n represents an integer.

2. The receptive solution according to claim 1, wherein the resin is a cationic resin and/or a non-ionic resin.

3. The receptive solution according to claim 1, wherein the receptive solution is ejected by an ink-jet method.

4. The receptive solution according to claim 1, wherein content of the surfactant is 0.5% by mass or more and 4.5% by mass or less in the whole amount of the receptive solution.

5. An ink set comprising:
    the receptive solution according to claim 1; and
    an ink composition containing a color material.

6. A method for producing a printed material, comprising a step of applying the receptive solution according to claim 1 on a recording medium, or on an ink composition containing a color material.

7. The receptive solution according to claim 2, wherein the receptive solution is ejected by an ink-jet method.

8. The receptive solution according to claim 2, wherein content of the surfactant is 0.5% by mass or more and 4.5% by mass or less in the whole amount of the receptive solution.

9. The receptive solution according to claim 3, wherein content of the surfactant is 0.5% by mass or more and 4.5% by mass or less in the whole amount of the receptive solution.

10. The receptive solution according to claim 7, wherein content of the surfactant is 0.5% by mass or more and 4.5% by mass or less in the whole amount of the receptive solution.

11. An ink set comprising:
    the receptive solution according to claim 2; and
    an ink composition containing a color material.

12. An ink set comprising:
    the receptive solution according to claim 3; and
    an ink composition containing a color material.

13. An ink set comprising:
    the receptive solution according to claim 4; and
    an ink composition containing a color material.

14. An ink set comprising:
    the receptive solution according to claim 7; and
    an ink composition containing a color material.

15. A method for producing a printed material, comprising a step of applying the receptive solution according to claim 2 on a recording medium, or on an ink composition containing a color material.

16. A method for producing a printed material, comprising a step of applying the receptive solution according to claim 3 on a recording medium, or on an ink composition containing a color material.

17. A method for producing a printed material, comprising a step of applying the receptive solution according to claim 4 on a recording medium, or on an ink composition containing a color material.

18. A method for producing a printed material, comprising a step of applying the receptive solution according to claim 7 on a recording medium, or on an ink composition containing a color material.

19. A method for producing a printed material, comprising a step of applying the receptive solution according to claim 8 on a recording medium, or on an ink composition containing a color material.

20. A method for producing a printed material, comprising a step of applying the receptive solution according to claim 9 on a recording medium, or on an ink composition containing a color material.

* * * * *